United States Patent [19]
Cohen et al.

[11] Patent Number: 6,011,918
[45] Date of Patent: Jan. 4, 2000

[54] METHODS, SYSTEMS AND COMPUTER PROGRAM PRODUCTS FOR GENERATING CLIENT/SERVER APPLICATIONS

[75] Inventors: Geoffrey Alexander Cohen, Durham; James P. Gray; David Louis Kaminsky, both of Chapel Hill; Manoj V. S. Kasichainula, Raleigh; Richard Adam King, Cary; Zhiyong Li, Chapel Hill, all of N.C.; Phillip Allan Stone, Tukwila, Wash.

[73] Assignee: International Business Machines Corporation, Armonk, N.Y.

[21] Appl. No.: 09/064,925

[22] Filed: Apr. 22, 1998

[51] Int. Cl.⁷ .................................................. G06F 9/44
[52] U.S. Cl. .................. 395/703; 395/702; 395/701; 709/203; 709/201; 709/226; 709/303; 709/304; 709/102; 709/104
[58] Field of Search .................................... 395/701–703, 395/708; 709/201, 203, 226, 230, 302–304, 102–105, 100

[56] References Cited

U.S. PATENT DOCUMENTS

| | | | |
|---|---|---|---|
| 5,485,616 | 1/1996 | Burke et al. | 395/709 |
| 5,535,394 | 7/1996 | Burke et al. | 395/709 |
| 5,581,758 | 12/1996 | Burnett et al. | 707/103 |
| 5,892,917 | 4/1999 | Myerson | 709/224 |
| 5,920,725 | 7/1999 | Ma et al. | 395/712 |

OTHER PUBLICATIONS

Birrell, et al., Implementing Remote Procedure Cells, *ACM Transactions on Computer Systems*, vol. 2, No. 1, pp. 39–59 (Feb. 1984).

Welch et al, "Metrics and techniques for automatic partitioning and assignment of object–based concurrent programs," Proceedings of Seventh IEEE Symposium on Parallel and Distributed Processing 1995, Oct., 25–28 1995, pp. 440–447.

Hammer et al, "Classifying object–oriented real–time systems: Ada 95 and Deal," Proceedings of the IEEE Symposium and Workshops on Engineering of Computer–Based Systems, Mar. 11–15, 1996, pp. 324–331.

Verhoosel et al, "Pre–run–time scheduling for object–based, concurrent, real–time applications," Proceedings of the IEEE Workshop on Real–Time Applications, Jul. 21–22, 1994, pp. 8–11.

Lonnie R. Welch, "Assignment of ADT modules to processors," Proceedings of the Sixth International on Parallel Processing Symposium, Mar. 23–26, 1992, pp. 72–75.

*Primary Examiner*—Tariq R. Hafiz
*Assistant Examiner*—Tuan Q. Dam
*Attorney, Agent, or Firm*—Myers Bigel Sibley & Sajovec; Jeanine S. Ray-Yarletts

[57] ABSTRACT

Methods, systems and computer program products are provided for automatically generating client/server applications from an application written to execute on a single processing system. The application has program classes and programmed methods associated with the objects. Each program class in the application is identified and the relationships between programmed methods in the classes is determined. The relationships between the programmed methods in the identified classes are then weighted based on the activity of the relationship. Similarly, each identified class in the application is also weighted based on the computing resources required by the identified class. The identified classes are then partitioned into client classes and server classes based on the weighted relationships between the programmed methods in the classes, the weight associated with each class and a computing topology associated with a target client processing system. The resulting client and server partition may then be used for code generation and distribution based on the capabilities of a requesting computer system.

24 Claims, 19 Drawing Sheets

METHODS, SYSTEMS AND COMPUTER PROGRAM PRODUCTS FOR GENERATING CLIENT/SERVER APPLICATIONS

FIELD OF THE INVENTION

The present invention relates to client/server applications and more particularly to the development of such applications.

BACKGROUND OF THE INVENTION

The distribution of a single program, so that a portion of the program executes on more than one computer has become more pervasive as "desktop" computers become more powerful. FIG. 1 demonstrates an example of a computer network containing several distributed computers upon which an application can execute. While most computer networks are many orders of magnitude larger, this small network is used as an example. Presently, many computer systems allow objects to communicate over a network. In this small network an application may be distributed throughout the network such that some functions of the program execute on one computer system and other functions execute on a different computer system.

One example of such a distributed processing system is the client/server program architecture. Client/server program architectures have been developed to allow a common portion of a program to execute on one processing system (the server application) and a second portion of the program to execute on various other processing systems (the client applications). However, developing client/server applications is known to be error prone and difficult. The programmer typically must write not only the client and server programs, but also the networking code that allows the client and server to interact. In addition, the programmer must decide what function to place on the client and what to place on the server. Choosing incorrectly can degrade the performance of the application.

The development of a client/server application may be further complicated in real-world computing environments where different users employ different equipment. For example, one user might use a network computer connected to a server over a high-speed local area network. Since network computers tend to have restricted memory capacities, they can only support client programs of limited size. In contrast, a second user might be using a personal computer connected to the same server using a 28.8 kilobits/second modem. In this second case, the client has virtually unlimited memory capacity, but is connected over a slow network. Consequently, in the second case, the decision about which functions to place on the client and which to place on the server need barely take into account client limitations, but should be extremely cautious about generating network traffic. As is demonstrated by these examples, a single division of function for a distributed application may not be sufficient for all computing topologies.

A basic function which is generally necessary to provide distributed processing is to allow program objects to communicate over a network. One method of allowing objects to communicate over a network is RPC, which stands for Remote Procedure Call. RPC has existed since the mid 1980s and is further described by Birrell and Nelson in *Implementing Remote Procedure Calls,* ACM Transactions on Computer Systems 2, 1984, pp 39–59. Further improvements have been made to RPC, such as DSOM, or Distributed Systems Object Model, continuing into the present. In the systems of the prior art, the programmer describes the interfaces to the objects using an Interface Definition Language (IDL). The systems then provide tools that automatically transform the IDL specification into executable code.

Recently, Sun Microsystems released an object oriented programming language called Java which includes a capability similar to that of RPC and DSOM called Remote Method Invocation, or RMI. Using systems which are Java enabled, the programmer can now write a distributed object program without explicit recognition of the network upon which the program will be running. However, using this technology, the programmer or implementer is still required to write additional code that enables remote invocation of objects (or write the IDL specification).

As with many coding tasks, such as the generation of client/server applications described above, writing IDL may be error-prone because of the complexity of the division of functions and because of the numerous decisions which must be made in the design of the program which may ultimately affect its performance. For example, as with client/server applications, the optimal distribution point may vary based on computing topologies. If two computers are equally powerful, then the optimal distribution might have an equal number of objects executing on each computer; if the two computers have disparate capabilities, then the more powerful computer might execute more of the objects. Since heterogeneous computing topologies are common, code written statically using an IDL may often result in suboptimal performance.

In addition, should it be determined that the distribution of objects is sub-optimal, the current specification is typically deleted and another written. Since choosing the optimal distribution point is a difficult task, this problem occurs often in modern programming environments.

One way of relieving the burden on programmers developing distributed function applications is through the use of program-creation tools which allow a programmer to specify a program using the tool, and indicate the object boundaries at which the objects are to be distributed. The tool then generates the executable code for the program. However, these tools generate static program partitions, and thus suffer from heterogeneity problems similar to IDL systems. In addition, tools do not typically interoperate. Thus, multiple programmers working on the same program are forced to standardize on the same tool to work effectively together. Since tools have strengths and weaknesses, standardizing on a single tool is undesirable.

In view of the above discussion, there exists a need for improvement in the development, generation and distribution of distributed processing applications, in particular, client/server applications.

SUMMARY OF THE INVENTION

In view of the above discussion, it is an object of the present invention to provide for the development of distributed processing applications, such as client/server applications, which may take into account the heterogeneity of a computer network.

A further object of the present invention is to simplify the development of distributed processing applications.

Yet another object of the present invention is to provide for differing computing topologies without requiring redesign of the distributed processing application.

It is another object of the present invention to allow dynamic selection of the client/server split of a distributed processing application.

It is still another object of the present invention to provide an improved method for creating distributed-object programs that allows the programmer to write a program as if it were running locally or in a single processing system.

It is a further object of the present invention to create a distribution of objects in a distributed program without modifying the classes created by the programmer.

It is yet a further object of the present invention to create the distribution of the objects without the need for a program creation tool.

These and other objects of the present invention are provided by methods, systems and computer program products for automatically generating client/server applications from an application written to execute on a single processing system. The application has program classes and programmed methods associated with the objects. Each program class in the application is identified and the relationship between programmed methods in the program classes is determined. The relationships between the programmed methods in the identified classes are then weighted based on the activity of the relationship. Similarly, each identified class in the application is also weighted based on the computing resources required by the identified class. The identified classes are then partitioned into client classes and server classes based on the weighted relationships between the programmed methods in the classes, the weight associated with each class and a computing topology associated with a target client processing system.

By automatically analyzing classes and methods in classes, the present invention allows for partitioning between client and server functions based on this analysis. Furthermore, by basing the partitioning on a target system computing topology, the present invention allows for the development of distributed processing applications, such as client/server applications, which takes into account the heterogeneity of a computer network. Because this process is based on an application program written to execute on a single processing system, the development of distributed processing applications is simplified. Furthermore, because the partitioning may be repeated for different target system topologies, the present invention provides for differing computing topologies without requiring redesign of the distributed processing application.

In particular embodiments of the present invention, the weighting of the relationships between the programmed methods is based on a textual analysis of the application written to execute on a single processing system. Alternatively, the weighting of the relationships between the programmed methods may be based on a result of a profiling analysis of the application written to execute on a single processing system.

In one embodiment of the present invention, the weighting of the relationships between the programmed methods is performed by determining for each calling programmed method, where the called programmed method is associated with a different program class than the calling programmed method, the number of times the called programmed method associated with the different program class is called by the calling programmed method. Then, for each calling programmed method and called programmed method, a weight associated with the program class of the calling programmed method and the program class of the called programmed method is assigned based on the number of times the calling programmed method calls the called programmed method. Furthermore, the weights of the relationships between the programmed methods may be adjusted by a predefined adjustment factor.

Also, the weighting of each identified class may be accomplished by instantiating each program object of a class and determining the marginal resources utilized to instantiate each program object. A weight is then assigned to each program class based on the determined marginal resources utilized to instantiate the program objects of the class. These weights may also be adjusted by a predefined adjustment factor.

The partitioning of the identified objects may be accomplished by selecting a subset of program classes based on the sum of the weights of the program classes and a target client system threshold value. The subset of program classes may then be partitioned as client classes and the remainder of the program classes as server classes based on the sum of the weights associated with programmed methods of the program classes of the subset of program classes and a target client cut weight threshold value. Preferably, the selected subset of program classes is the subset of program classes which satisfies the target client system threshold value and has the lowest sum of the weights associated with programmed methods of the program classes of the subset of program classes. Furthermore, the partitioning may be carried out for a plurality of computing topologies associated with a plurality of target client processing systems so as to provide a plurality of sets of client classes and corresponding server classes.

In a further embodiment of the present invention, a client application is generated based on the objects of classes partitioned as client classes and a server application based on the objects of classes partitioned as server classes.

The application may be distributed by distributing client objects to a client computer system in response to a request for execution of the client application and server objects to a server computer system. This distribution may be accomplished by receiving a request for the client application and a client capability set and selecting a client application based on the received client capability set. The client application corresponding to the client capability set may then be provided to the client computer system and a corresponding server application provided to the server computer system.

By generating code for varying target system topologies and then providing differing code to a client and server based on the capabilities of the client, the present invention allows dynamic selection of the client/server split of a distributed processing application.

In one particular embodiment of the present invention, a call graph of the classes and methods of the application is generated. Nodes of the call graph correspond to classes of the application. Subnodes of the call graph correspond to methods of a class and directed arcs between the nodes or subnodes of the graph correspond to calls from one method to another. The weighting of the relationships between the programmed methods in the identified classes based on the activity of the relationship may then be accomplished by assigning a weight to each directed arc of the call graph based on the expected number of traversals of the directed arc during execution of the application. The weighting of each identified class in the application based on the computing resources required by the identified call may be accomplished by assigning to each node of the call graph a weight based on the expected resources required by each node.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described with respect to FIG. 2, FIG. 3, FIG. 5, FIG. 7, FIG. 9, FIG. 17, FIG. 18 and FIG. 19 which are flow diagrams and flowcharts illustrating the operations of a client/server generation system utilizing the present invention. It will be understood that each block of the flowchart and flow diagram illustrations, and combinations of blocks in the flowchart and flow diagram illustrations, can be implemented by computer program instructions. These program instructions may be provided to a processor to produce a machine, such that the instructions which execute on the processor create means for implementing the functions specified in the flowchart or flow diagram block or blocks. The computer program instructions may be executed by a processor to cause a series of operational steps to be performed by the processor to produce a computer implemented process such that the instructions which execute on the processor provide steps for implementing the functions specified in the flowchart or flow diagram block or blocks.

Accordingly, blocks of the flowchart or flow diagram illustrations support combinations of means for performing the specified functions, combinations of steps for performing the specified functions and program instruction means for performing the specified functions. It will also be understood that each block of the flowchart or flow diagram illustrations, and combinations of blocks in the flowchart or flow diagram illustrations, can be implemented by special purpose hardware-based systems which perform the specified functions or steps, or combinations of special purpose hardware and computer instructions. Accordingly, the present invention may take the form of an entirely hardware implementation, an entirely software implementation, or a combination of hardware and software.

Figure 1:
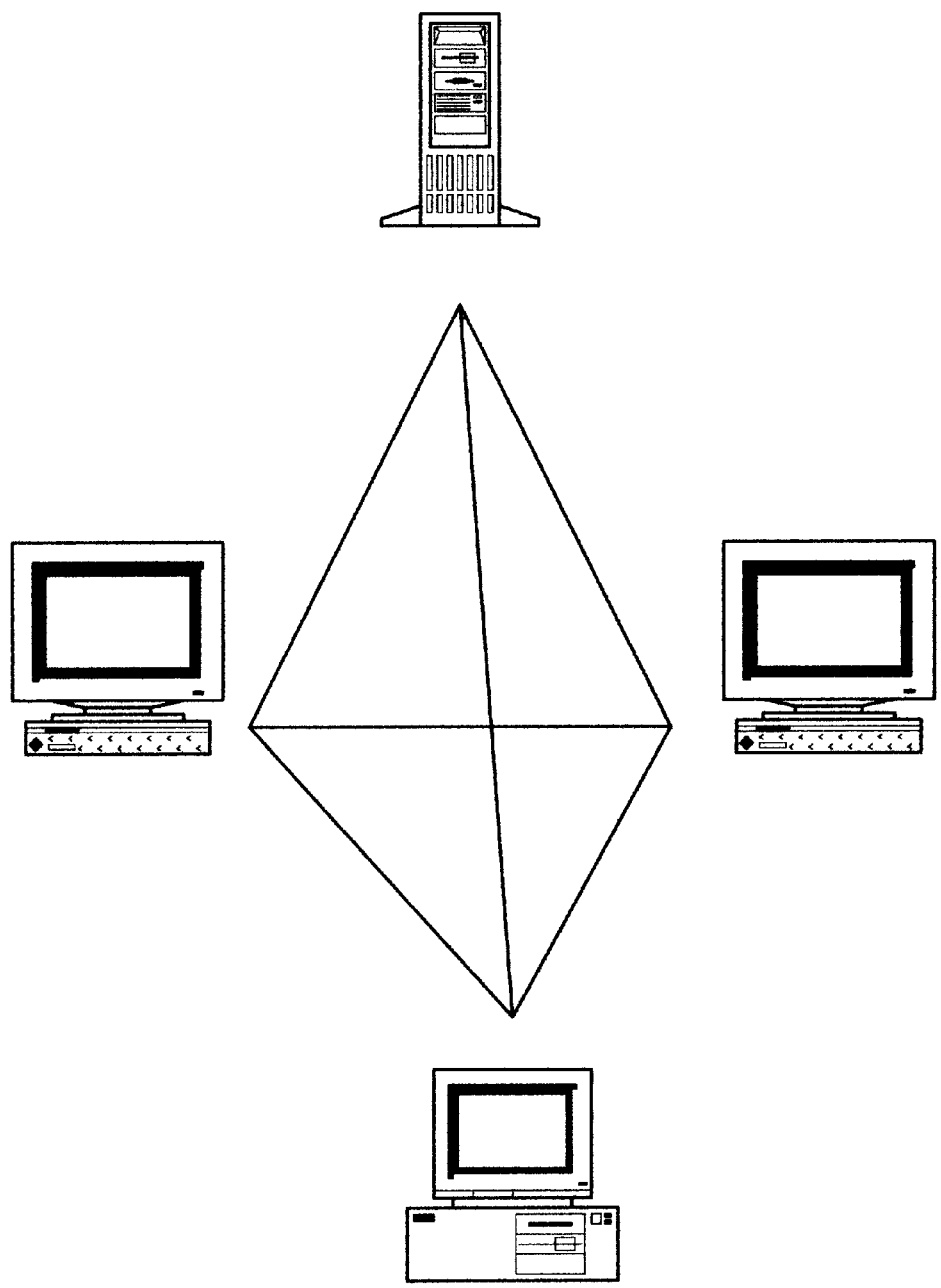
FIG. 1 is a diagram depicting a conventional network having differing computer configurations.
Figure 2:
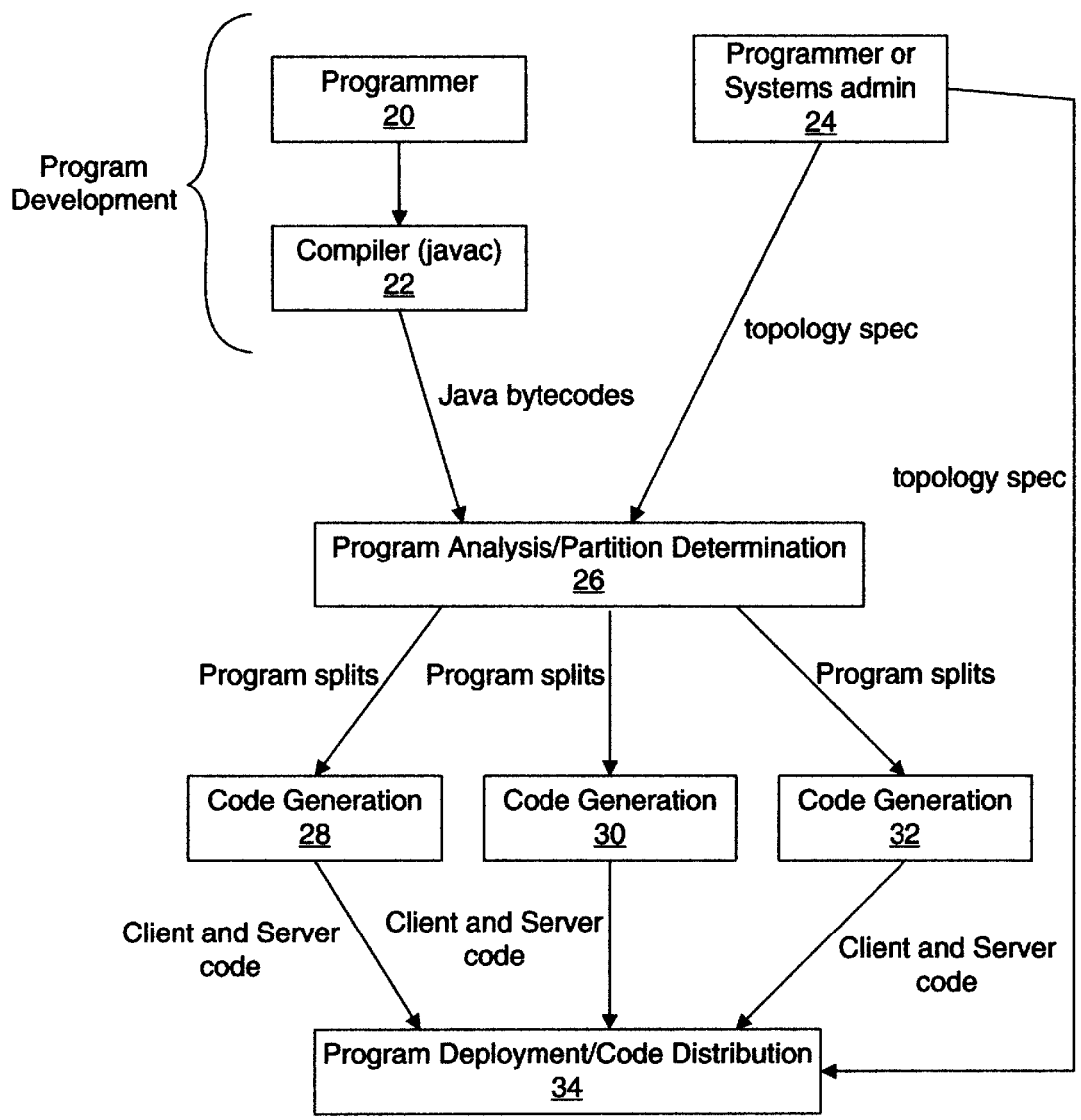
FIG. 2 is a flow diagram of an application generation process according to various aspects of the present invention.

Aspects of the present invention are illustrated in the flow diagram of FIG. 2 which illustrates the application development process according to the present invention. As seen in FIG. 2, a client/server application development and deployment includes a program development phase, a phase in which the target client topology specification is created, a program analysis phase, a networking code generation phase and a program deployment phase. In the preferred embodiment illustrated in FIG. 2, the client/server application developed is an object oriented application wherein the classes of the program objects may include programmed methods within a class.

Various aspects of the present invention, including the Automatic Object Distribution (AOD) of the present invention, eliminate the requirement that programmers write their programs with the knowledge that the objects of a class will be distributed over a network. It also eliminates the need for programmers to write programs in a special language that supports distributed objects, or to write using any particular tool when wanting to distribute the work across the network. Instead, using the present invention, programmers write programs in a common object-oriented language, such as Java (Java is a trademark of Sun Microsystems), and compile the code into unlinked executable code. (In the computing literature, unlinked executable code is often called "object code". When describing object-oriented systems, the use of the term "object code" creates confusion, therefore the term "bytecodes" has been adopted for purposes of the present invention.)

As seen in FIG. 2, in block 20 the programmer initiates the process by writing the application program as if it were going to run as a standalone program (i.e. the application is to execute in a single processing system). That is, the programmer is not required to determine a priori which classes will reside on the client and which will reside on the server. Furthermore, since the programmer does not determine which classes are to be in the client application and which classes are to be in the server application the programmer need not provide any networking code.

In the preferred embodiment, the programmer writes his code in the Java programming language, and compiles the program using the standard Java compiler, (javac) (block 22). The result is a standard set of Java class files called bytecode files.

To enable all aspects of the development process of the present invention, programmers should adhere to certain development guidelines. First, all input parameters should be treated as if they were passed by value. That is, a called method (a "callee") should not alter the contents of any object passed as parameters. Any results should be passed as results of the method call.

Users also should not code single classes that call both windowing (java.awt) and data-access (java.io, java.jdbc, etc.) libraries. Data-access calls are presumed to occur on the server (where files reside), and windowing calls are presumed to run on the client (where the display monitor is provided). Including both data-access and windowing calls in the same class requires that the class be on both the client and the server. This dual location may be both inefficient and may limit the partitioning strategy described below.

In addition, classes should not directly access variables in another class. Rather such variables should be accessed through "getter" and "setter" methods. For example, the following code illustrates the preferred access of the variable x using the setX and getX functions.

```
class A{
    int x;
    int getX ( ) {return x;}
    void setX (int myX) {x = myX;}
}
    class B {
        void foo {
            int y;
            Aa = newA( );
            a.x = 1;       //WRONG
            y = a.x;       //WRONG
            a.setX (1);    //RIGHT
            y = a.getX ( ); //RIGHT
        }
}
```

Accessing variables through getters and setters is both better object-oriented design, and allows the automatic generation of proxies along method-call boundaries. These guidelines are often associated with good object-oriented programming style, and thus are not overly onerous.

The steps described above are standard parts of the Java application development process. The bytecodes from the compile operation (block 22) are utilized by the program analysis and partition determination operation (block 26) to determine which classes and their associated objects will be associated with the client and which with the server.

To make the partitioning decision, a programmer or a systems administrator defines the computing topologies of the target client systems (block 24). For example, one set of target topologies may specify that 133 MHz network computers with 32 MB of RAM and no disk will be connected over a 10 Mbit/second LAN, and that 233 MHz personal computers with 64 MB of RAM and 8 gigabytes of disk (1 GB of disk which can be used to hold a swap file, effectively extending available memory) will be connected over a 28.8 Kbit/second modem. This information may be supplied in a text file, such as:

```
# CPU speed in MHz, RAM in MB, Disk in MB, network
              speed in Kbits/sec
         133, 32, 0, 10000.0 # case 1
         233, 64, 8000, 28.8 # case 2
```

(The '#' symbol indicates the start of a comment; the rest of the line is ignored.) However, as will be appreciated by one of skill in the art, numerous other ways of specifying target system topologies may also be utilized.

As is seen in FIG. 2, the topology specification is provided by the programmer or system administrator for use in the automated partitioning process (block 26). The partition between client classes and server classes is made by analyzing the provided bytecodes and topology specifications to determine "split points" for each topology (block 26). A split point defines how the program is to be partitioned into client and server programs.

As is further seen in FIG. 2, the split points for each topology defined by the programmer or system administrator is utilized in a code generation phase to generate client and server code for each topology. Thus, block 28 illustrates the utilization of a first set of program split data to generate a first set of client code and server code for the first target system topology. Block 30 illustrates the utilization of a second set of program split data to generate a second set of client code and server code for the second target system topology. Finally, block 32 illustrates the utilization of a third set of program split data to generate a third set of client code and server code for the third target system topology. As will be appreciated by those of skill in the art, the present invention is not limited to the number of topologies used in the present example, but may incorporate any number of different client/server splits based on any number of target system topologies depending on the particular application and network in which the application is to be utilized.

After the client and server code sets are generated, these code sets are distributed to requesting clients based on the topology of the client system (block 34). Thus, if a client computer having capabilities corresponding to the first target system topology requests execution of the application, the client code of the first code set is sent to the client computer and the server code of the first code set is provided to the server.

Various aspects of the present invention will now be described in more detail. The operations of blocks 20 and 22 will be well understood to those of skill in the art and, therefore, will not be described in more detail. The generation of target system topologies described above may be carried out in any number of ways as long as sufficient information about the target client systems is made available for the partitioning and code distribution operations of the present invention. Furthermore, the information about the target system may contain any information about the target client system on which a partitioning determination may be made. While the present invention is described with respect to target client system topologies, as will be appreciated by those of skill in the art, the present invention may also utilize server topologies or a combination of client and server topologies.

Figure 3:
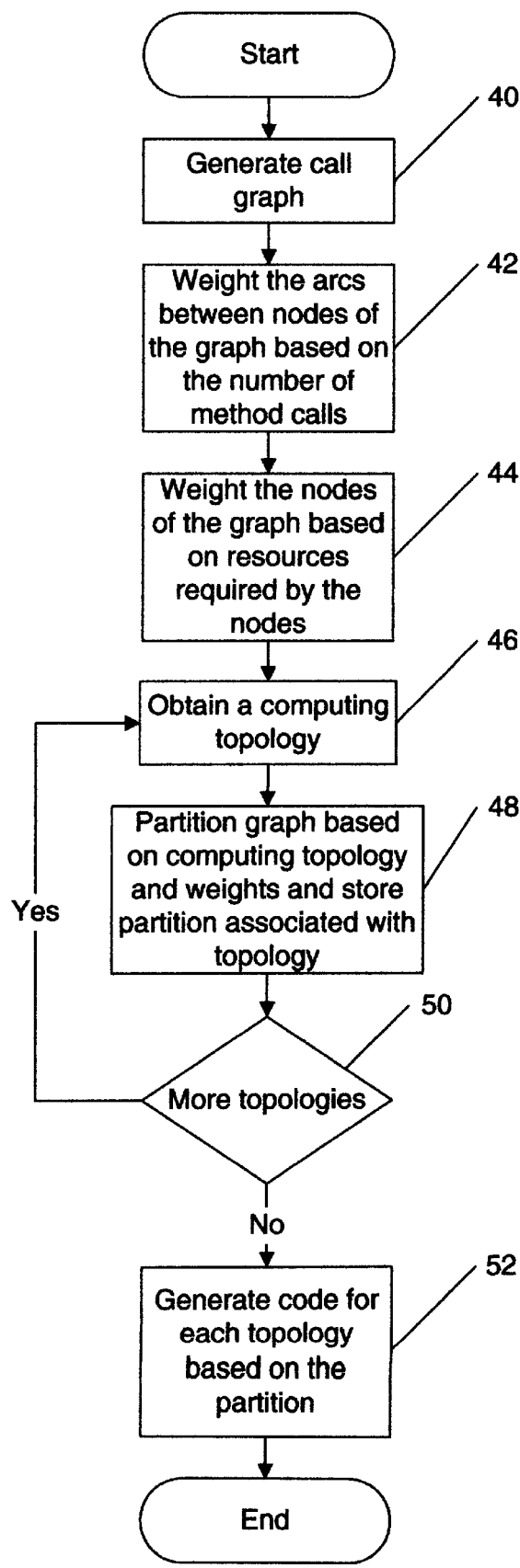
FIG. 3 is a flow chart illustrating one embodiment of client/server application generation according to the present invention.

Turning to the partitioning and code generation operations of blocks 26, 28, 30 and 32, these operations are generally illustrated in the flow chart of FIG. 3. As is seen in FIG. 3, in the preferred embodiment of the present invention, the partitioning operations begin by generating a call graph which identifies each class in the application and which reflects the relationships between programmed methods in the classes (block 40). The information required to create this call graph is present in the Java class files. Information about class files can be found in the Java virtual machine specification and is known to those of skill in the art.

Figure 4:
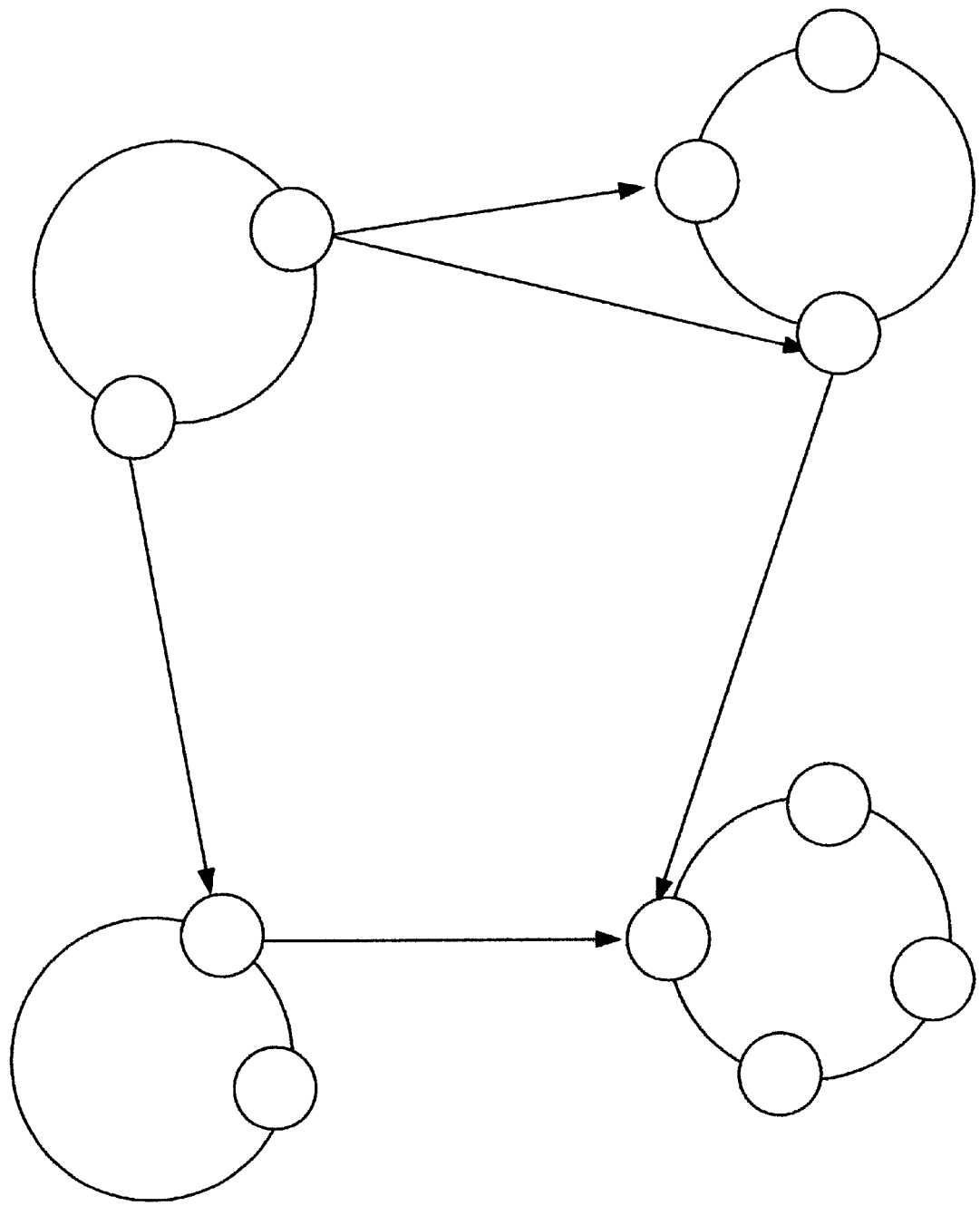
FIG. 4 is a directed call graph of an application program according to the present invention.

An example call graph is illustrated in FIG. 4. As seen in FIG. 4, the large circles or nodes of the call graph correspond to the classes of the application and the smaller circles or subnodes correspond to the programmed methods associated with each class. The directed arcs between the subnodes reflect the relationship between the programmed methods with each arc corresponding to a call of one method by another method.

As is further seen in FIG. 3, after the classes are identified and the programmed methods relationships defined, the relationships are weighted based on the number of calls of each method (i.e. a weight is assigned to each directed arc of the call graph) (block 42). As is seen in block 44, each class is also assigned a weight based on the computing resources required by the class (i.e. each node is assigned a weight) (block 44). In the preferred embodiment of the present invention, program analysis is performed using a static, textual analysis of the program. However, as will be appreciated by one of skill in the art, a simulation or performance analysis of the application program may also be utilized to weight the classes and the method calls.

After the classes and method calls are weighted, a computing topology of a target computing system is obtained (block 48) and the classes are partitioned based on the computing topology and the weighted classes and method calls (block 48). The output of these operations is a set of partitions, one for each computing topology. Each partition is specified as a list of the set of classes that will execute on the server and a set of classes that will execute on the client. The partition result is then stored and associated with the topology used to create the partition (block 48). If more topologies are available, then the process is repeated for each available topology (block 50).

After partitioning the objects, the application and client code sets are generated for each topology (block 52). Thus, the present invention provides for the automatic generation of client and server applications from a standalone application so as to provide a client/server application which accounts for the heterogeneity in a network.

Figure 5:
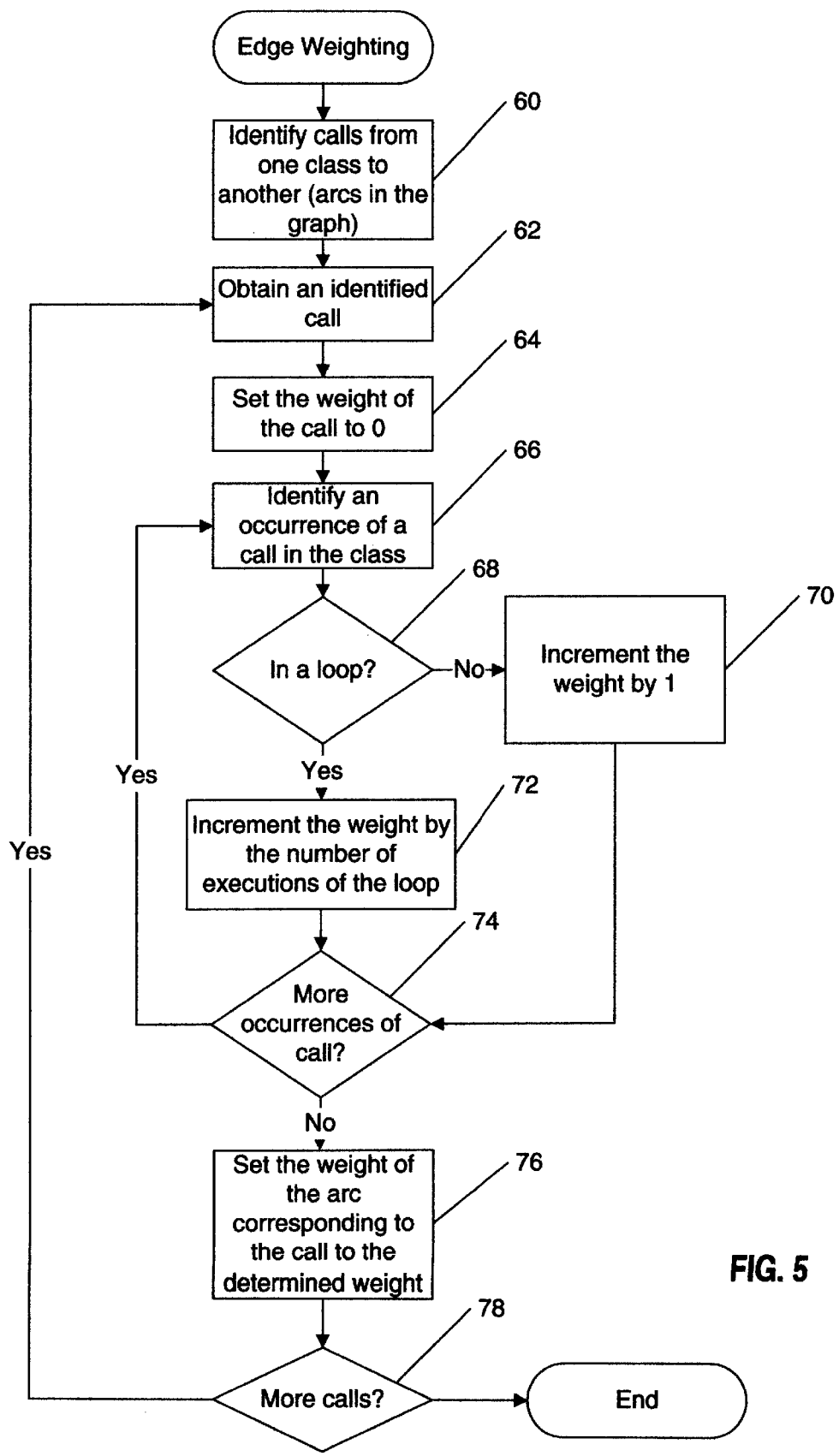
FIG. 5 is a flow chart illustrating operations to provide edge weighting according to the present invention.

FIG. 5 illustrates in more detail the operations of block 42 of FIG. 3. FIG. 5 illustrates the process of assigning a weight to each call relationship between the programmed methods which may be referred to as "edge weighting." Edge or arc weights are used to represent approximate communication load imposed by method calls. Higher weights reflect heavier load and can indicate either that a larger number of calls are made to the method or that more data are passed during a single call. The communication load is considered in the partitioning process because, in cases in which networks are slower (e.g. modems), communication overhead should be minimized, possibly at the expense of higher client requirements.

As is seen in block 60, the edge weighting operations begin by identifying the calls from one class to another (i.e. the programmed method calls which are reflected by the directed arcs of FIG. 4). An identified call is then obtained and the weight of the call set to 0 (block 62 and block 64).

The operations of blocks 66, 68, 70, 72 and 74 perform a "best guess" textual analysis to determine the number of calls made. If the call is not in a loop-construct, the accumulated weight of the call is incremented by one. If the call is in a loop to be executed a constant number of times (as determined by standard flow analysis), the accumulated weight is incremented by the constant number of iterations.

Thus, as seen in block 66, an occurrence of the identified call is located and it is determined if this call is in a program loop (block 68). If the call is not in a loop then the weight of the call is incremented by 1 (block 70). If the call is in a loop, then the weight of the call is incremented by the number of executions of the loop (block 72). It is then determined if there are more occurrences of the call (block 74). If more occurrences are present, then the operations of block 66, 70, and 72 are repeated until all calls of the method have been analyzed for a class.

Figure 6:
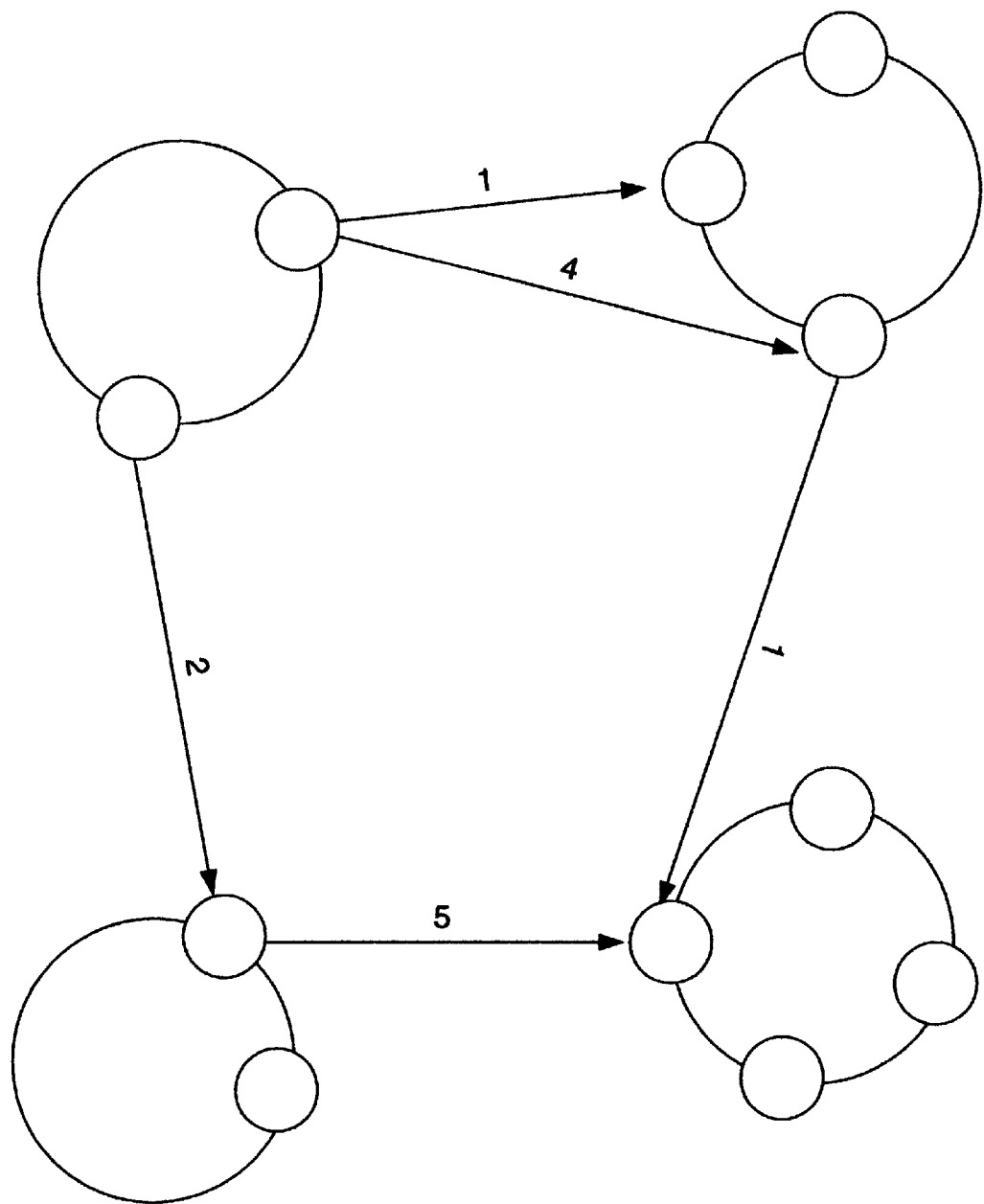
FIG. 6 is the directed call graph of FIG. 4 with edge weights applied.

Once all of the occurrences of a call have been evaluated, the weight of the arc in the call graph is set to the final value for the call (block 76). Alternatively, the weight calculated may be adjusted by a predetermined scaling factor to reach the final weight of the programmed method call. For example, the final weight could be multiplied by 1.5 to assure a conservative estimate of the weight. If more programmed method calls are present (block 78), the operation is repeated until a weight is assigned to all method calls (i.e. each directed arc is assigned a weight). An example of a call graph after edge weighting is illustrated in FIG. 6. As is seen in FIG. 6, each directed arc has associated with it a value which is the weight of that method call from one class to another.

Figure 7:
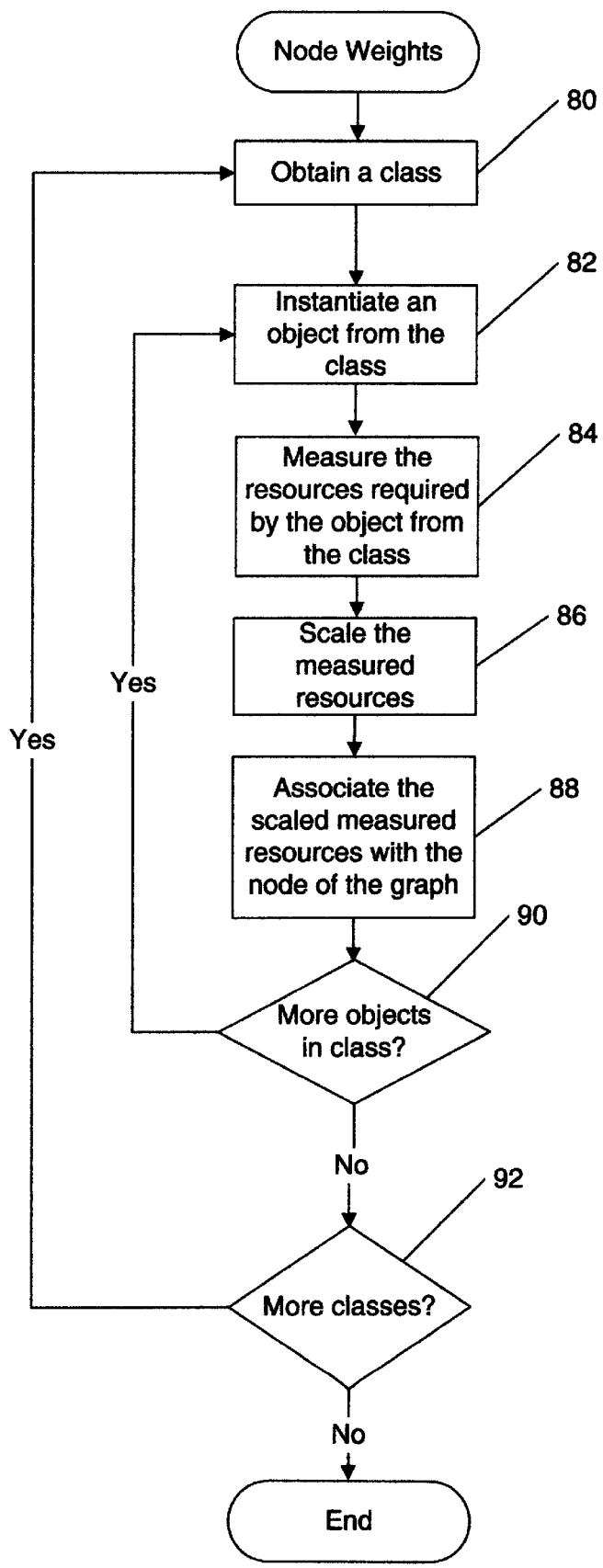
FIG. 7 is a flow chart illustrating operations to provide node weighting according to the present invention.

FIG. 7 illustrates in more detail the operations of block 44 of FIG. 3. FIG. 7 illustrates the process of assigning a weight to each class or node of the call graph of FIG. 6. Node weights are used to represent an approximation of client resource requirements. For example, a node weight can be used to represent the amount of Random Access Memory (RAM) required to instantiate the object of a class. In the preferred embodiment of the present invention, node weights are used to represent client RAM requirements.

Figure 8:
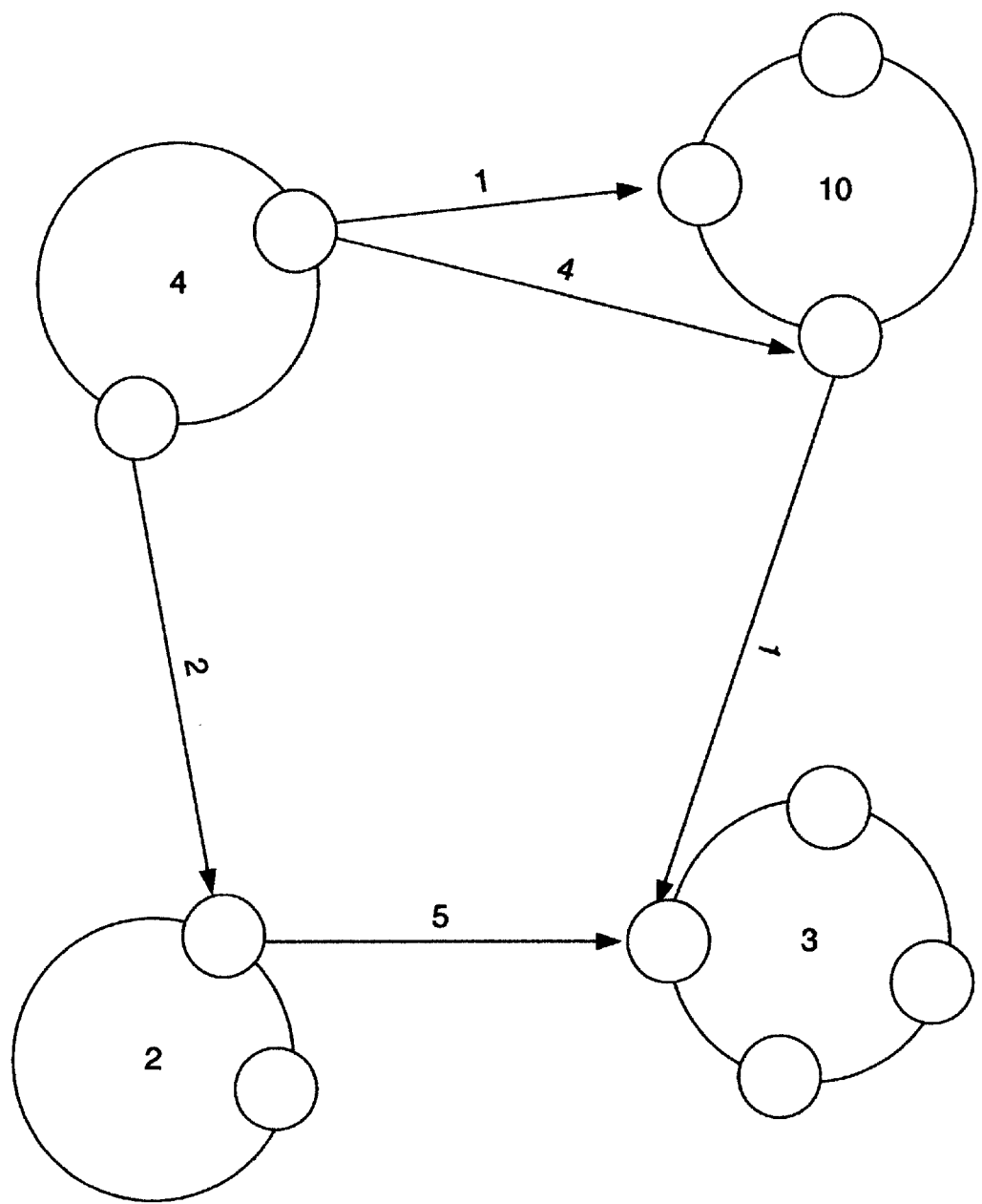
FIG. 8 is the directed call graph of FIG. 4 with edge weights and node weights applied.

As seen in FIG. 7, the node weighting process begins by obtaining an identified class of the program (block 80). An object of the class is then instantiated (block 82) and the resources required to instantiate the object are measured (block 84). Such a resource measurement may be made, for example, by well known techniques for determining the marginal amount of RAM required to instantiate the object. The measured resources are then scaled by an "uncertainty" factor which is a predetermined scaling factor to assure a conservative approximation of the resources used (block 86). For example, the measured resources used may be scaled by a 50% scaling factor by multiplying the measured resources by 1.5. The scaled weight is then associated with the class (i.e. the node on the call graph) (block 88). This process is repeated for each object of a class (block 90) to provide a total weight for the class and for each class in the application program (block 92). An example of a call graph with weighted nodes is illustrated in FIG. 8.

Figure 9:
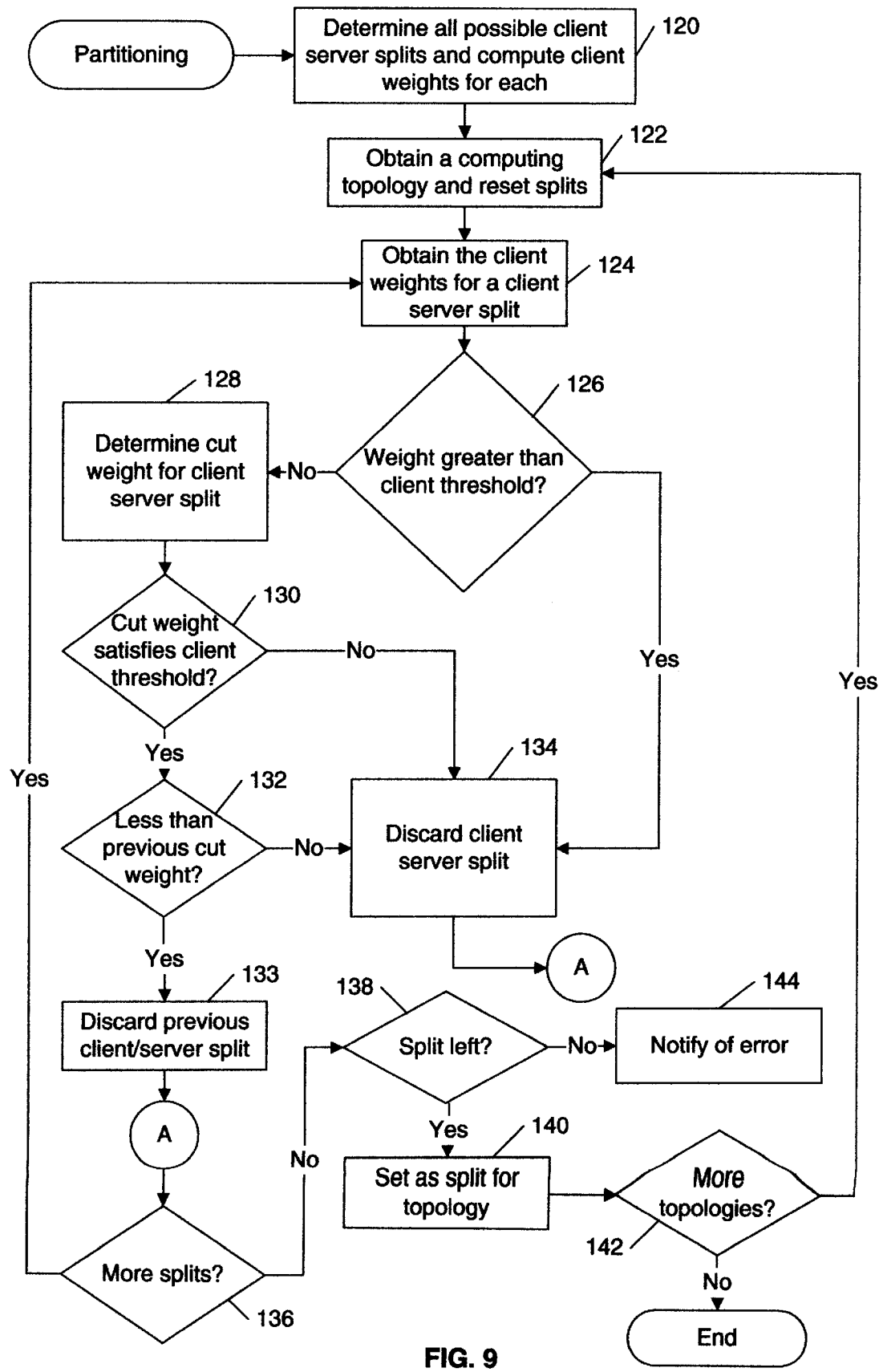
FIG. 9 is a flow chart illustrating operations to partition classes into client classes and server classes according to the present invention.

After calculating weights for each node and edge in the graph, graph partitions can be calculated. For each entry in the topology file provided by the programmer or system administrator, a partition is calculated. FIG. 9 illustrates in more detail the partitioning operations of blocks 46, 48 and 50 of FIG. 3. As seen in FIG. 9, all possible client/server splits are determined and the client weights computed for each (block 120). Client weights are determined by summing the node weights of the nodes which are partitioned to the client. As will be appreciated by those of skill in the art, client weights for trivial partitions such as all classes being partitioned to the client or all to the server need not be determined.

After determining the client weight for possible partitions, a target computing system topology is obtained (block 122). The client weight for a client/server split is then obtained and compared to the client threshold specified by the target computing system topology (block 124 and block 126). If the client weight is greater than the threshold specified by the target system topology, then the client server/split is discarded (block 134). If more splits are left in the set of all splits for which client weights were determined, then the client weight for the next client/server split is obtained for evaluation (block 136 and block 124).

If the client weight of the client/server split is not greater than the client threshold, then the client/server split is a candidate for the final partition for the topology and the "cut weight" for the client/server split is determined (block 128). The cut weight is the sum of the weight of all arcs crossing from classes assigned to the server to classes assigned to the client and the weight of all arcs crossing from classes assigned to the client to classes assigned to the server. The cut weight is then compared to the client threshold for cut weight based on the target computing system topology (block 130). If the threshold is exceeded, then the client/server split is discarded (block 134) and another client/server split is evaluated if more splits are available (block 136).

If the cut weight does not exceed the client cut weight threshold, then the cut weight is compared to the cut weight of the previous client/server split which met both the client weight and cut weight thresholds of the target topology (block 132). If the cut weight is greater than the cut weight of the previous split, then the previous candidate is considered a better candidate and the current client/server split is discarded (block 134). Another client/server split is evaluated if more splits are available (block 136). However, if the cut weight is less than the cut weight of the previous split, then the current candidate is considered a better candidate and the previous client/server split is discarded (block 134). If more client/server splits are available, then the evaluation process is carried out again (block 136).

If all of the client/server splits have been evaluated, then it is determined if a client/server split remains (i.e. a split with a client weight meeting the client weight threshold and a cut weight meeting the client cut weight threshold) (block 138). If no such client/server split remains then a partition could not be found and the user is notified of an error condition for the target system topology (block 144). If, however, a client/server split remains, then this partition is the minimum cut partition and it is associated with the target topology (block 140). It is then determined if a partition has been requested for an additional target topology (block 142) and the process begun again if an additional target topology remains (block 122). As a result, when the operations of FIG. 9 are complete, the partition sets of client classes and server classes for each target topology are provided.

Figure 10:
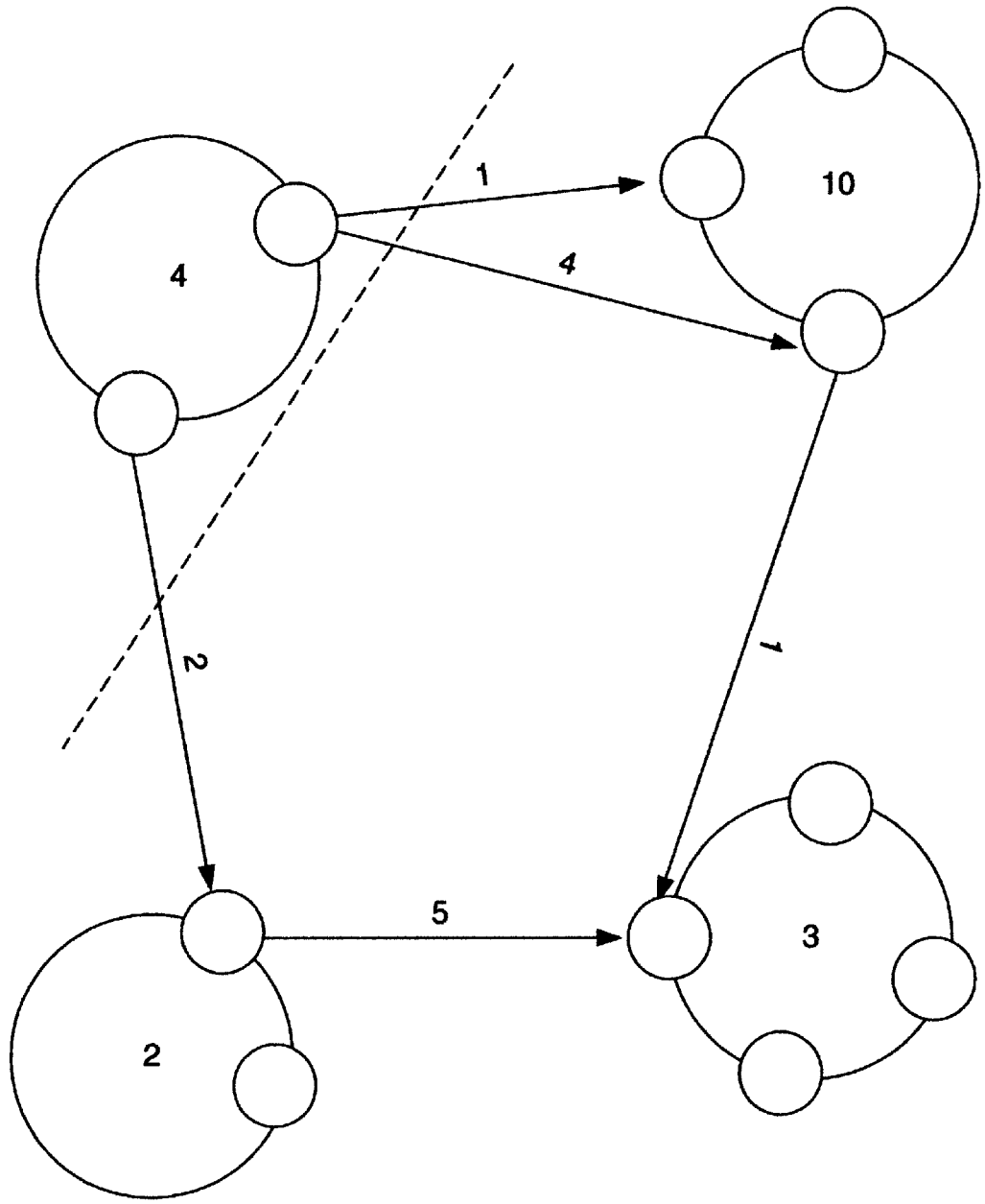
FIG. 10 is a directed call graph of FIG. 8 illustrating one cut to partition the classes of the application according to the present invention.

FIG. 10 illustrates one partition where the client threshold value is 4 and the client cut weight threshold is 7. A valid partition is illustrated in FIG. 10 by the dotted line with client classes being above the line and server classes below the line. In this instance, the client weight is 4 and the cut weight is 7, thus providing a partition which meets the requirements of the target client topology.

Figure 11:
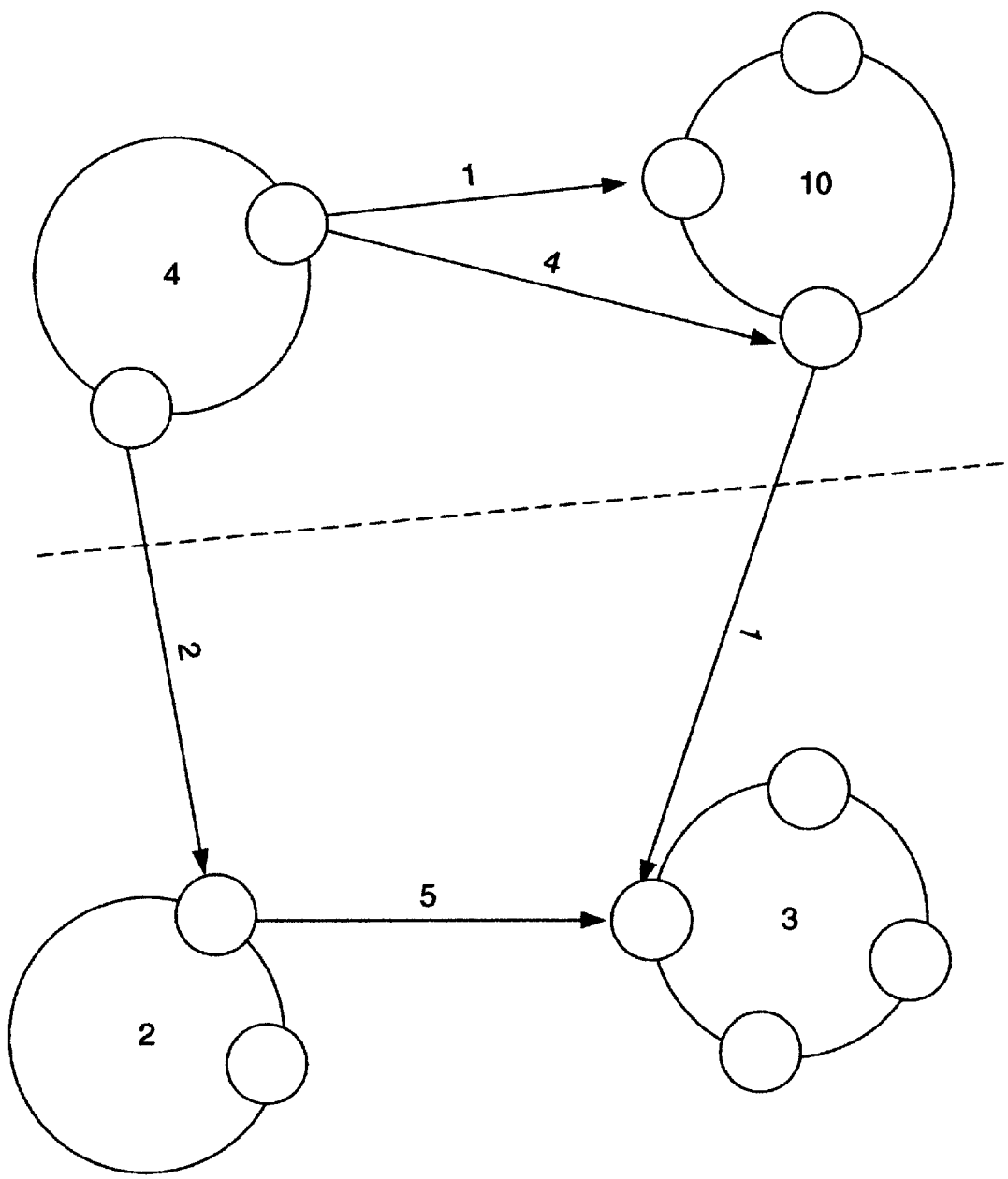
FIG. 11 is a directed call graph of FIG. 8 illustrating an invalid cut to partition the classes of the application according to the present invention.

FIG. 11 illustrates an invalid partition. Using the same target client topology, and the dashed line of FIG. 11 as the partition with client classes above the dashed line and server classes below the dashed line, the partition does not meet the client threshold of 4. The client weight in the partition of FIG. 11 is 14. The partition does meet the cut weight threshold as the cut weight is 3. However, to be a valid partition, all of the threshold criteria of the target topology must be met.

Figure 12:
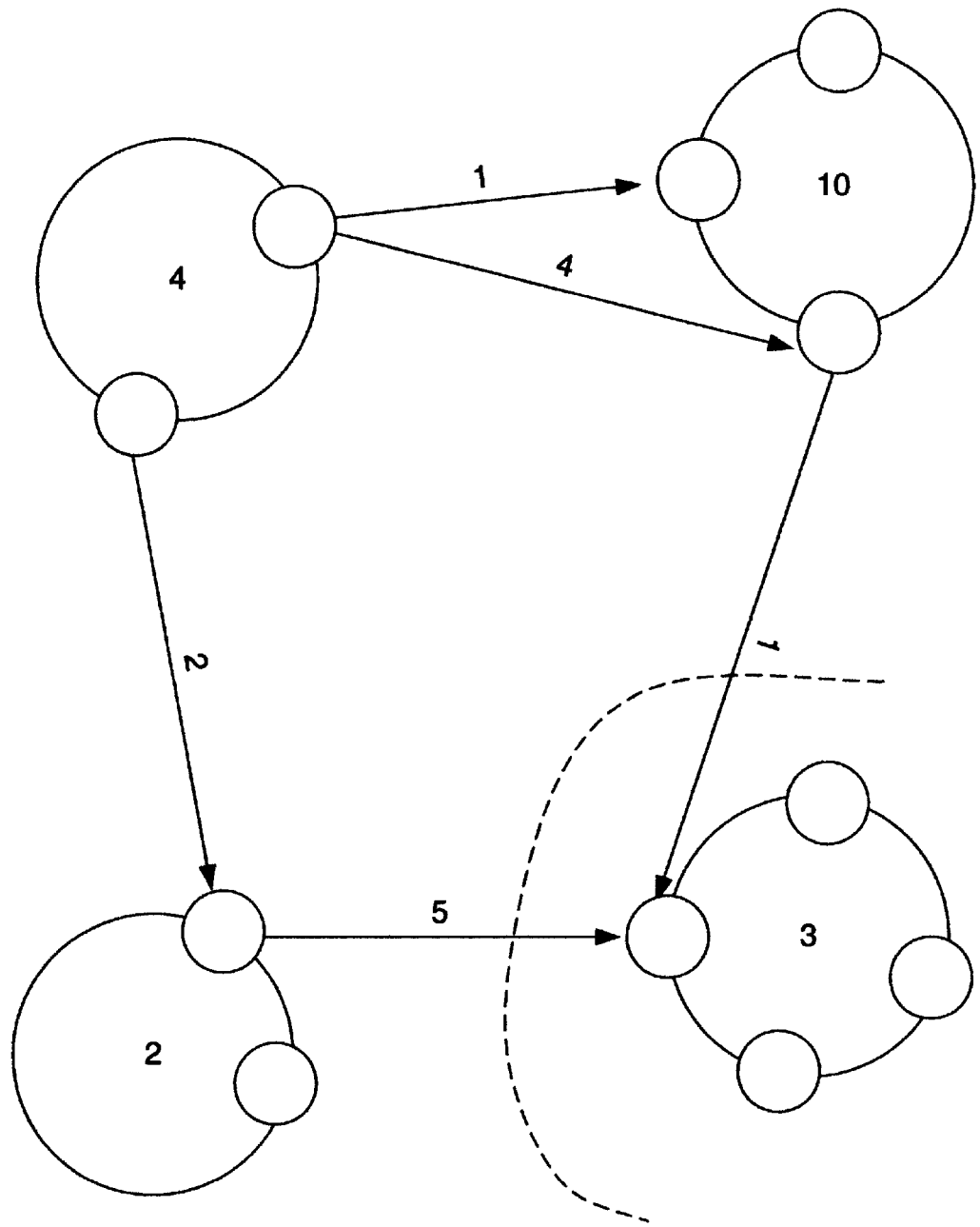
FIG. 12 is a directed call graph of FIG. 8 illustrating a minimum cut to partition the classes of the application according to the present invention.

FIG. 12 illustrates the minimum cut partition for the application. As seen in FIG. 12, the client classes are below and to the right of the dashed line and the server classes are above and to the left. For the partition in FIG. 12, the client weight is 3 and the cut weight is 6. This partition is the minimum cut weight partition which also satisfies the client weight threshold of the target topology. Accordingly, in the present example, the partition of FIG. 12 would be utilized for code generation.

Figure 13:
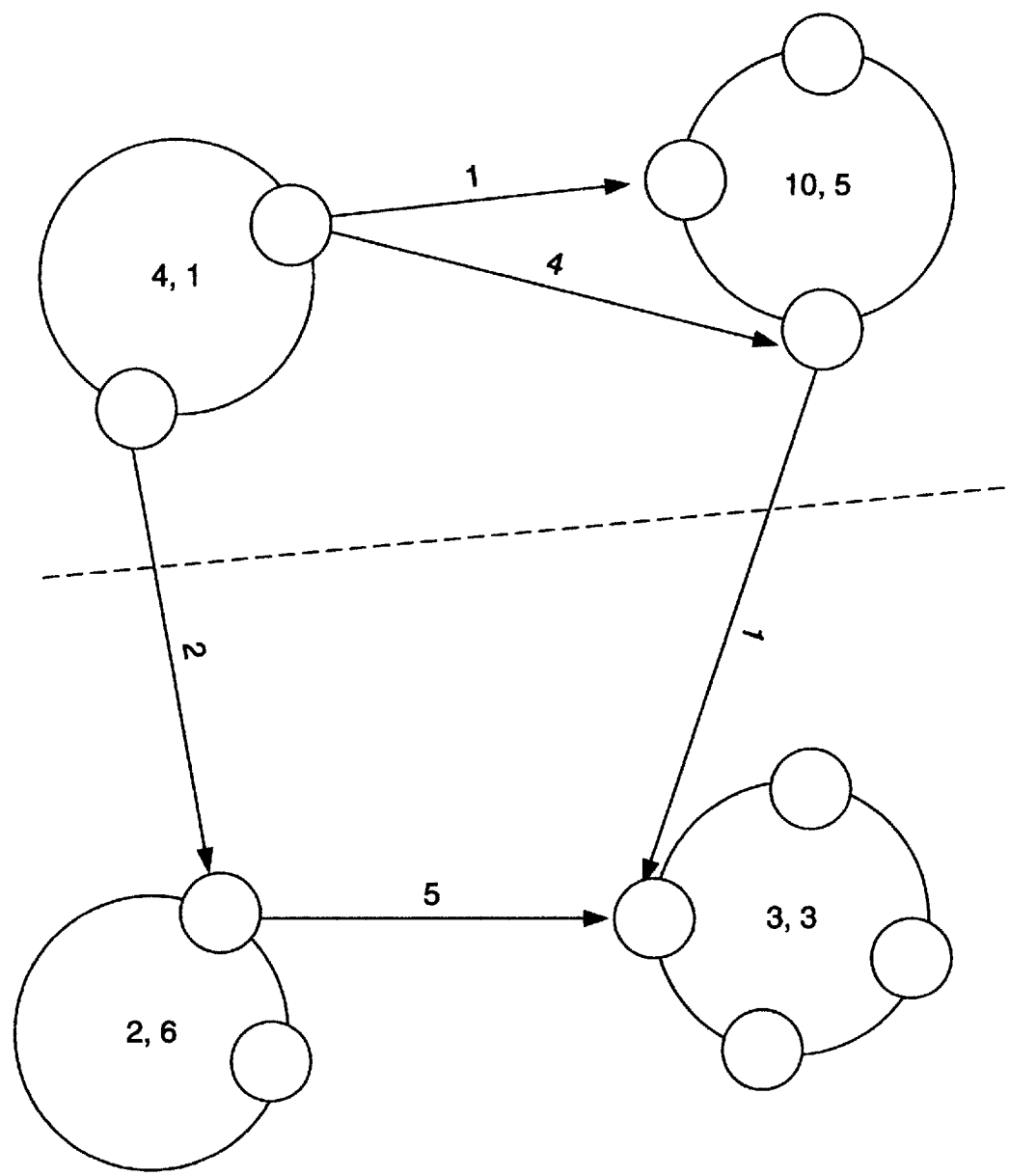
FIG. 13 is a directed call graph illustrating a multiple criteria alternative embodiment of the present invention.

As will be appreciated by one of skill in the art, the present invention is not limited to the above exemplary embodiment but may be extended to encompass other criteria in determining appropriate partitions. For example, the node weights can be vectors rather than single numbers. As seen in FIG. 13, a two-element node-weight vector might represent a RAM constraint and a disk capacity. Valid cuts would require that all node-weight constraints are satisfied.

Similarly, the computation of node and edge weights may be accomplished using dynamic information generated by profiling an exemplary execution of the program. In such an implementation profiling information rather than static analysis would be utilized to generated the weights. In a profiled implementation, the program is run such that it simulates a typical execution of the program, and profiling information is collected. Methods of collecting profiling information are well-known to those of skill in the art. Multiple runs can also be used, in which case, the results may be averaged. Based on the profiling information, node and edge weights may be assigned. In this case, node weights (single values or vectors) may be determined based on the actual resources consumed during the profiling run, optionally scaled by an uncertainty factor. Edge weights are assigned based on the actual number of calls made from one method to another and the volume of data passed during those calls. The remainder of the partitioning process may then be carried out as described above.

After partitioning of the application for each target topology, the code is generated for each topology. The code is preferably generated as described in commonly assigned U.S. patent application Ser. No. 08/852,263 entitled A PROCESS FOR RUNNING OBJECTS REMOTELY filed May 7, 1997, the disclosure of which is incorporated by reference as if set forth fully herein.

Figure 14:
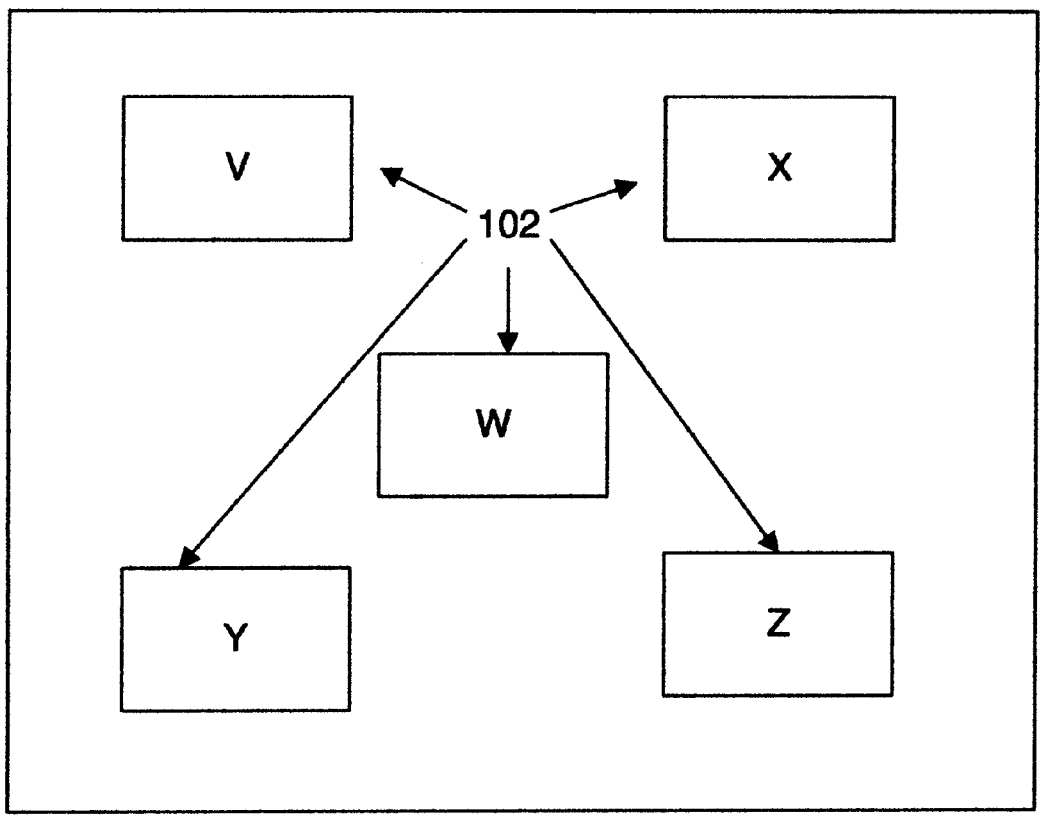
FIG. 14 depicts a computer memory containing five objects.
Figure 15:
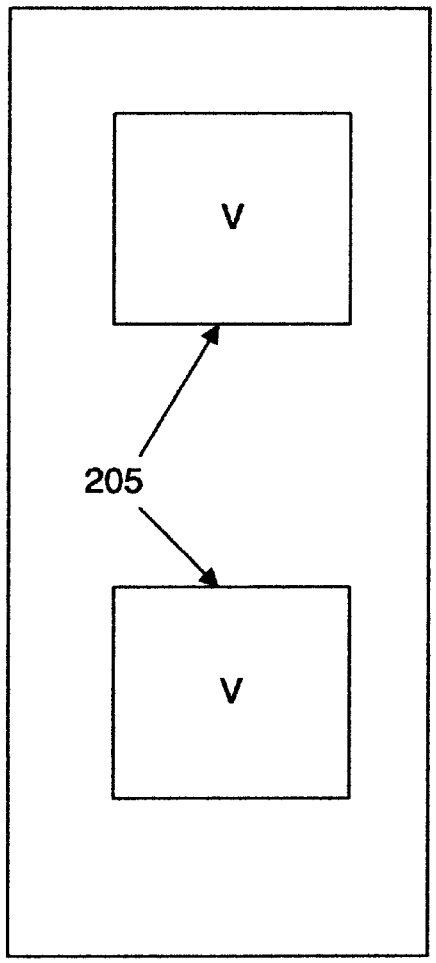
FIG. 15 depicts a distributed system in which two objects execute from one computer memory and three objects execute from a different computer memory.
Figure 15:
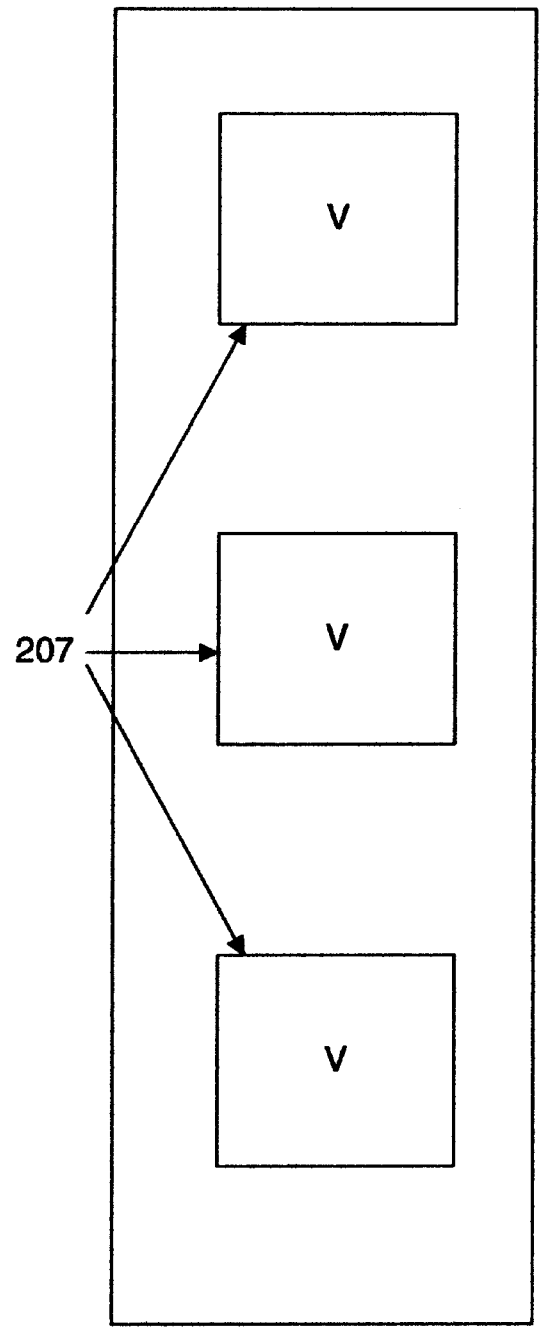

In generating the code for each target topology, the present invention may utilize techniques for executing or running objects remotely which is herein referred to as Automatic Object Distribution (AOD). As shown in FIG. 14, an object oriented program is written with many independent objects that call each other to perform a unified function. FIG. 14 depicts a computer memory 101 in which objects 102 V, W, X, Y & Z all reside. The present invention partitions the application so that objects may be moved from a first computer to a second computer to be executed. This is shown in FIG. 15. In FIG. 15 objects V & Y 205 remain in a first computer memory 201 while objects W, X, & Z 207 are moved to a second computer memory 203.

The distribution of objects across computing systems can be done, for instance, to balance the workload between the first computer and the second computer and to efficiently utilize the server resources, the client resources and the network resources. However, this distribution of objects creates additional complexities since each of the program objects are capable of calling external routines herein referred to as methods. The separation of the program objects into multiple computers for execution requires that all of the methods or objects which, due to the separation of the objects to different computer memories now access methods which are no longer coresident with the calling method on the same system, know that some of the objects are located elsewhere on the network and understand how to access those remote objects.

The AOD generates the client and server code by generating two proxies. The proxies allow method calls written for local invocation to be invoked over a network. If a split is indicated between some class Y to be executed locally, and some class X to be executed remotely, the AOD process generates the proxies to overcome the intervening network. Together, these proxies intercept the calls from Y, pass them to X, and return the result to Y. This is shown in more detail in FIGS. 16A and 16B.

Figure 16A:
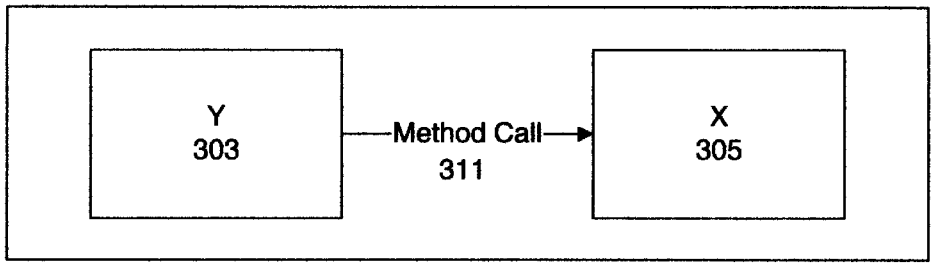
FIG. 16A depicts a method where two objects execute in the same memory.

FIG. 16A represents the computer system in which a program is running in a single memory 301. Both object Y 303 and object X 305 reside in the same memory and a method call 311 is used to invoke object X 305 from object Y 303. The AOD process uses information in the bytecode file for a class, such as for example, X 305 of FIG. 16B, to generate the two proxy files (X' 315 and X"317) that contain classes serving as proxies for X 305. X' 315 contains a class named X that has all of the public methods in X 305. (Note that since the original class file X 305 will be located on the remote machine, no name conflict exists.) X" 317 contains a class with a unique name (X") that contains the method that makes calls to the public methods in class X. X' 315 resides on the same machine as Y 303; X" 317 resides on the same machine as X 305. Since X' 315 contains a class called X and that class contains all of the public methods in X 305, when Y 303 makes a call against a method in the original class X 305, that call is actually made against a method in the new class X residing locally and contained in file X' 315. X' 315 passes the call information to X" 317 which then makes a local call to X 305. The results of the local call are propagated back to Y 303 by way of X" 317 and X' 315. The result is that the application, written to execute locally, can be distributed across the network without requiring that the programmer write or change any of the program code.

Automatic Object Distribution (AOD) of the preferred embodiment of the present invention uses the Java programming environment as described above, although the present invention is not limited to Java and the application of this invention to other object-oriented environments would be straightforward to one skilled in the art. As is described above, the exemplary embodiment of the present invention assumes that the programmer has written a program in Java as if it were to run locally (e.g., it does not include any Remote Method Invocation code), and used the standard Java compiler to compile the source files into corresponding bytecode files. The AOD process then utilizes the convention that, in object oriented programming, all objects are to be accessed through method calls (not through direct access to public variables). In Java, each class compiles into a separate bytecode file. (Hence, bytecode files are often called "class files.")

Figure 17:
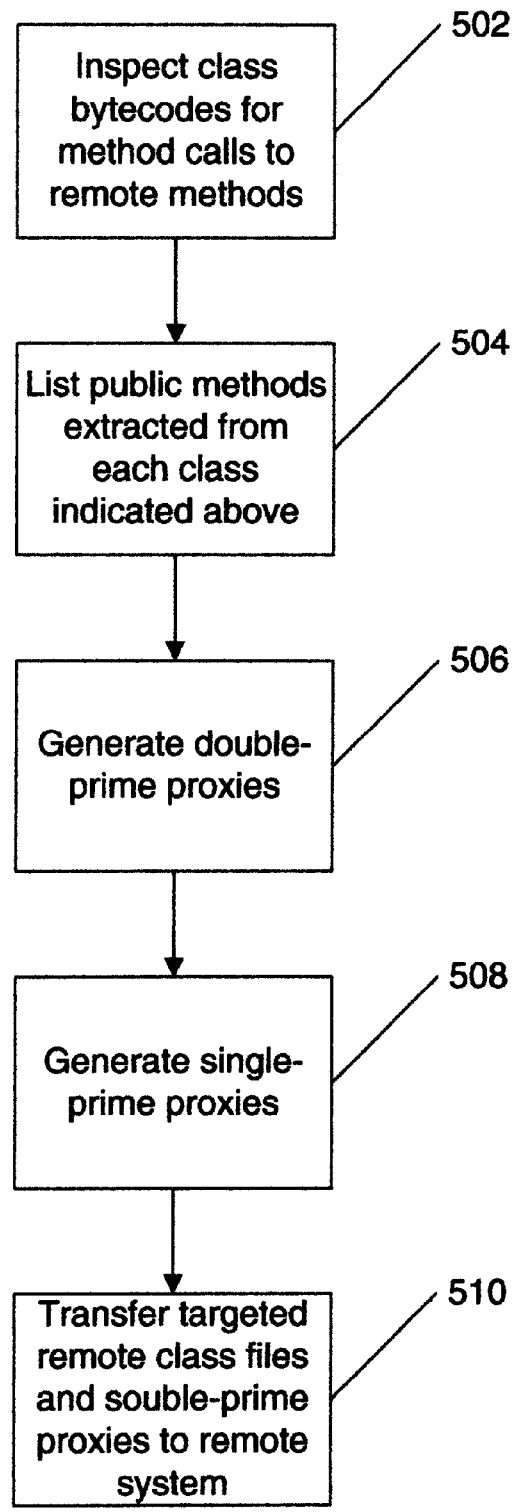
FIG. 17 is a flow chart illustrating the operations of a distribution aspect of the present invention.

To run the objects remotely, the AOD, using the partition set to specify which classes will be client and which classes will be sevrer classes, does the following as referred to in FIG. 17:

1) AOD inspects the bytecode for each class to determine which classes will receive method calls from classes that will execute remotely (block 502).
2) For each object X that will be called upon from a remote machine (i.e. a client object), a list of its public methods is extracted from bytecode file for X, and stored (block 504).
3) Based on the list of public methods, a proxy, called X" is generated. X" is constructed to contain methods which have similar names as the public methods in X. Each of the constructed methods make corresponding method calls against X. It also contains the code necessary to register itself with the RMI registry (block 506).
4) Based on the list of public methods, a proxy, called X' is generated. X' is constructed to contain the public methods in X. Each of the constructed methods make corresponding remote method calls (using Java's RMI function) against X". This proxy class has the same name that X does (block 508).
5) All of the original bytecode files designated as remote or client and all "double-prime proxies" are transferred to the remote machine (i.e. the client); all bytecode files designated as local and all "prime" proxies remain on the local machine (i.e. the server) (block 510).

Each of these operations is described in more detail below. The Java compiler (and compilers of many object-oriented languages) generates a bytecode file in a well-known format which allows the inspection process to occur successfully. To allow the various bytecode files to be linked together, each bytecode file contains information about the methods called from each class. Thus, by reading the information about the methods from the file, AOD can generate the required list of interrelated classes.

Similarly, the bytecode files contain information about the public methods of the class described by the bytecode file. Thus, by reading the information about the public methods from the file, AOD can generate a list of all public methods. The bytecode files also contain information about parameters and return values.

Note that some implementations of Java contain a function called "reflection" that allows programmatic determination of public methods supported by a class. If reflection is implemented, it can be used to replace the process of inspecting the bytecode file.

Given the list of all public methods on a class, a double-prime proxy class (X") that contains the similarly named methods may be generated, and each of these methods makes calls to the method on X. In the preferred embodiment, the calls are generated as Java source, and compiled dynamically using Java's standard dynamic compilation facility. Thus, if X contains methods A and B, X" would be written as:

```
Class Xprimeprime extends UnicastRemoteObject
                        implements Xprimeprimeinterface {
Xx;
Xprimeprime ( ) {// initializer
    x = newX( );
}
A_AOD ( ){// passes through calls to A
    x.A( );
}
B_AOD ( ){// passes through calls to B
    x.B( );
}
```

Note that the convention is used where the method in the proxy is suffixed with "_AOD." For example, the method "A_AOD" calls the method "A" in X. Any convention can be used so long as it is reproducible and consistent.

Given the list of all public methods on a class, it is similarly straightforward to generate a prime proxy class (X') that contains those methods, and that makes remote calls (using RMI) to similarly named methods on X". In the preferred embodiment, the calls are generated as Java RMI source, and compiled dynamically using Java's standard dynamic compilation facility.

In addition to the proxy X", an interface X"Interface which contains the signatures for all of the public methods in X is also generated as required by Java's standard RMI implementation. Given the same information on all public methods on a class, it is also straightforward to generate the interface X"Interface.

```
interface Xprimeprimeinterface extends java.rmi.Remote {
    A_AOD( );
    B_AOD( );
}
```

Thus, if X contains A and B, X' would be generated as:

```
Class Xprime {
    Xprimeprimeinterface x;
    Xprime ( ){// constructor
        x = (Xprimeprimeinterface)Naming.lookup(Xprimeprime);
        // do the RMI lookup
    }
    A( ) (//call remote A
        x.A_AOD( );
    }
    B( ) {// call remote B
        x.B_AOD( );
    }
}
```

In this example, Naming.lookup( ) will return a remote reference to X" by querying the RMI registry. By convention, the return object is cast to the type of X"Interface.

Note that while the proxy class is called X, no name collision occurs with the original X. Since the proxy X will execute on the local machine, and the original X was identified as moving to the remote machine, only one X exists per machine. The files are then transferred by any means available on the system where this function is implemented.

Figure 16B:
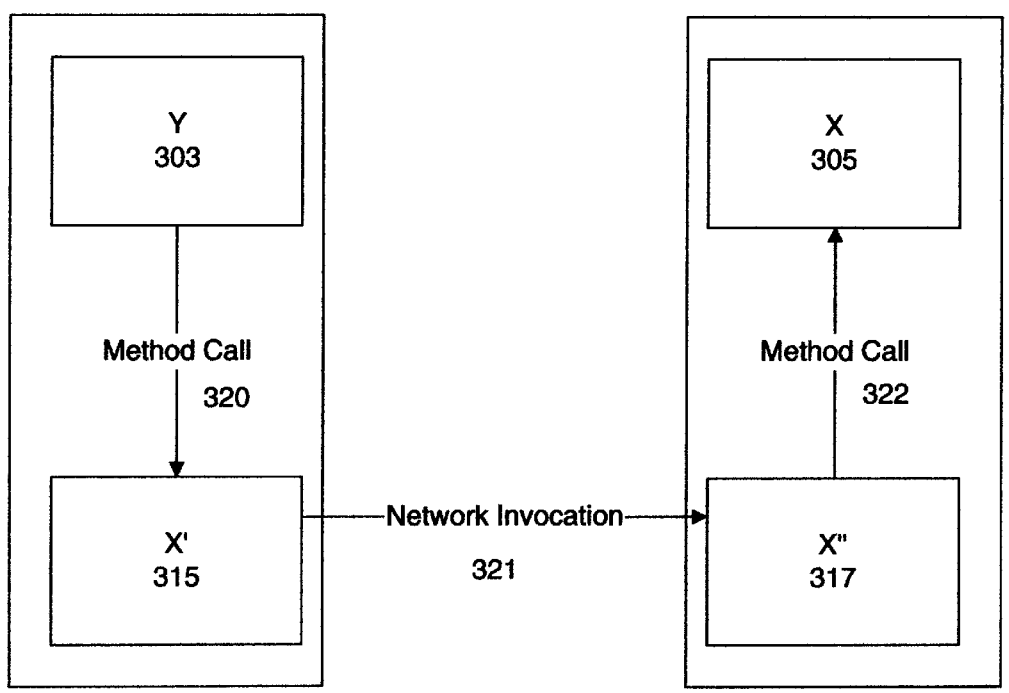
FIG. 16B depicts the objects of FIG. 16A after being distributed using the present invention.

Once the proxies have been established as shown in FIG. 16B, the following occurs at execution time:

If the partition indicates that the program should be distributed between some object Y and some object X, where Y accesses X only through method calls, when Y calls a public method foo( ) on X, the following occurs. First Y makes the call to foo( ) as usual. (It must since its code is unchanged). Since the proxy Xprime is the only X on the local machine and it contains a method foo( ), the call will be made on the prime proxy for X.

By construction, the method foo( ) in X makes an RMI call to method foo_AOD( ) on the remote double-prime proxy, returning the results. By construction, foo_AOD on the double-prime proxy makes a local call to foo( ) on X. Since X is unchanged, it will execute the original foo( ), passing back the results to foo_AOD in the double-prime proxy, which passes them to the prime proxy, which returns them to Y. Thus, the call is semantically equivalent to a local call.

Figure 18:
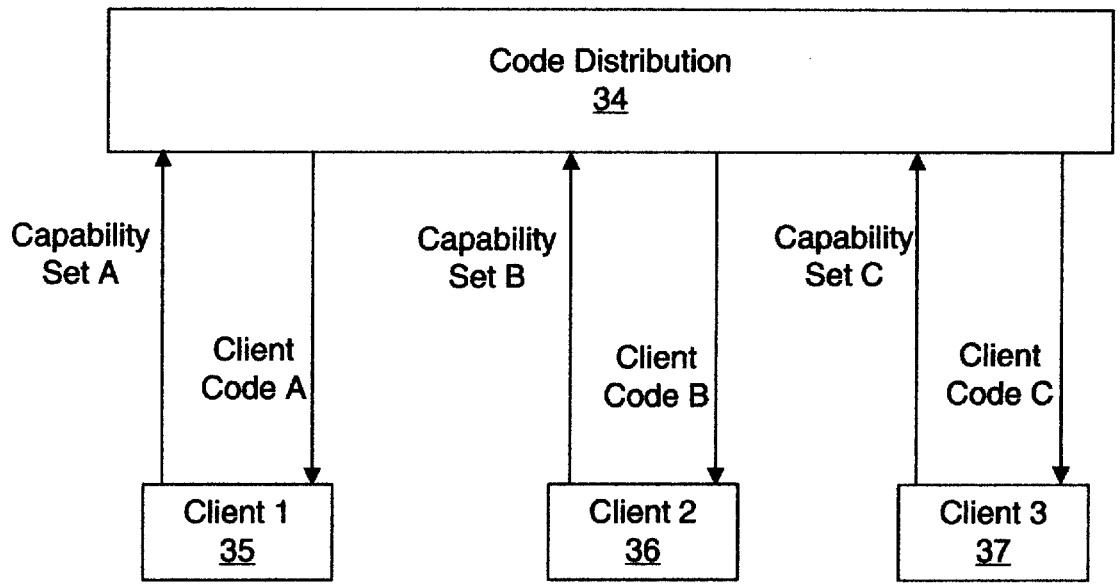
FIG. 18 is a block diagram illustrating the distribution of code according to various aspects of the present invention.

After the code is generated based on the distribution of a partition, this code may be automatically distributed as is illustrated in FIG. 18. The output of the code generation phase is provided to the code distribution component 34. This component is responsible for storing all versions of the server code and corresponding versions of the client code. When a client accesses the code distribution component 34, the client identifies its capabilities. For example, the client might identify itself as a network computer with 32 MB of RAM connected over a 10 Mbit/sec local area network. The code distribution component 34 compares the client capabilities with topology information and selects the matching client code. It then responds with corresponding client code, and launches the server code on the server. The client code may be transferred from the server to the client using standard communication protocols such as HTTP (the HyperText Transfer Protocol). At this point, the client is prepared to run.

FIG. 18 illustrates the interaction between multiple clients and the code distribution function 34. In FIG. 18 client functions are illustrate on the left side of the page and server functions are illustrated on the right side of the page. As seen in FIG. 18, a client 35 provides a capability set to the code distribution function 34 which responds with the appropriate client code based on the capability set received. Thus, a first client 35 may provide Capability Set A to the code distribution function 34 and receive Client Code A in response. A second client 36 may provide Capability Set B to the code distribution function 34 and receive Client Code B in response. Similarly, a first client 37 may provide Capability Set C to the code distribution function 34 and receive Client Code C in response. Thus, the present invention may provide tailored code to a client requesting client code to take into account the computing topology of the client.

Figure 19:
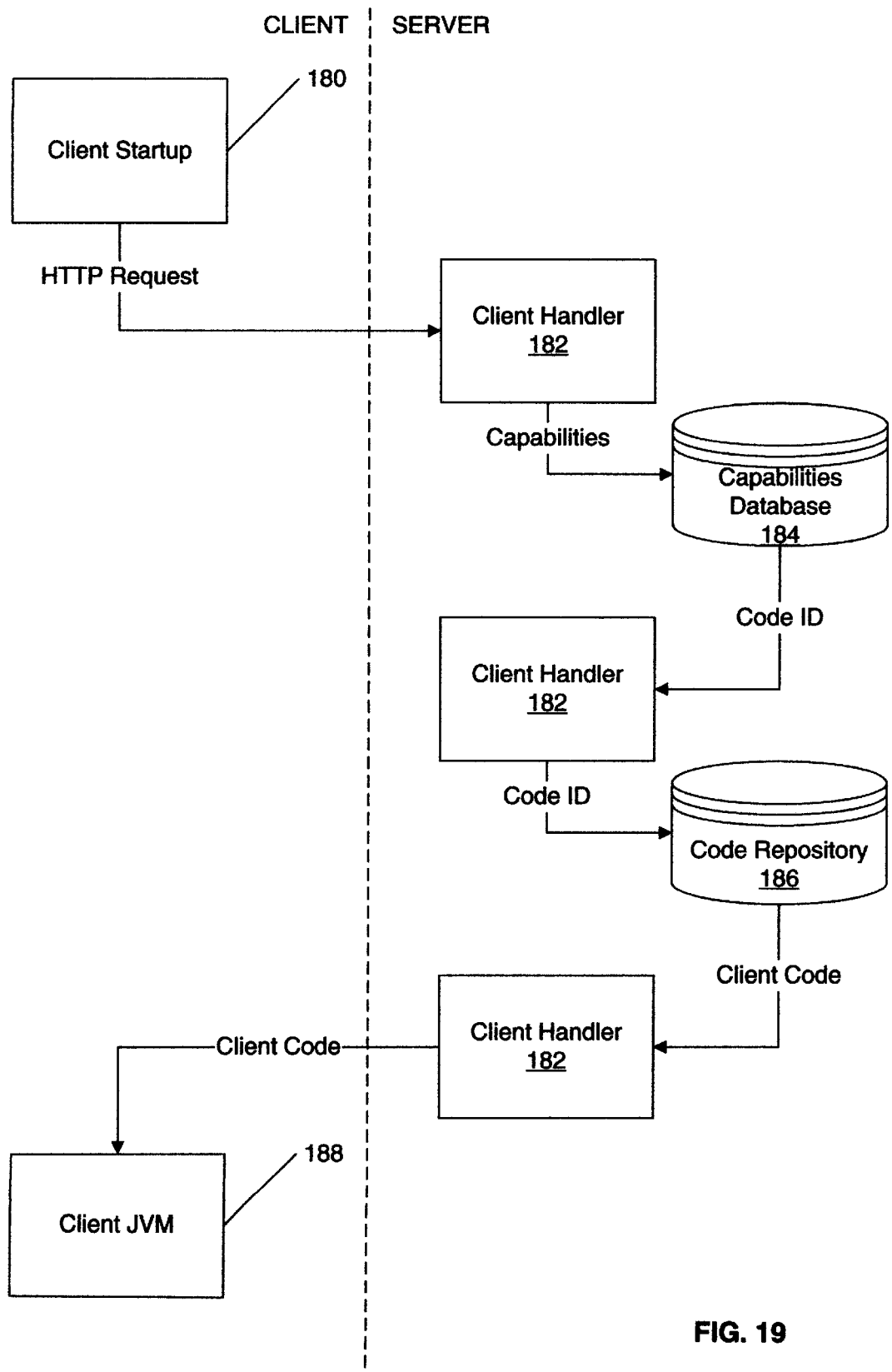
FIG. 19 is a flow diagram illustrating the operations of an exemplary distribution of code to a client.

FIG. 19 illustrates one particular implementation of code distribution according to the present invention. In block 180, the client starts the process by making a request to the server to initiate a particular application. That request flows using standard HTTP and contains the name of the application that is to be started and also the client capabilities. The client may determine its capabilities by making a standard operating system query as is known in the art. However, alternatively, the client could execute a small piece of code to approximate its capabilities. For example, it could execute a standard mathematical calculation such as a factorization routine to find its CPU speed, and execute a network 'ping' to approximate the network speed.

In any event, a client handler function 182 on the server receives the HTTP request and provides the capabilities to a capabilities database 184. The capabilities database 184 matches the client's capabilities against the capabilities supplied to the capabilities database within the code distribution component on the server. The capabilities database returns an identifier (Code ID) for the set of code to be sent to the client. The client handler 182 uses this identifier to fetch the client code from a code repository 186. The code is then provided to the client's Java Virtual Machine (JVM) for execution (block 188).

Thus, the present invention may provide for the generation and distribution of client/server applications from a single standalone application. In addition, since the distribution requires no additional programming, multiple instances of the same program may be deployed on different computing configurations, each with its own distribution (and thus performance characteristics), depending on the particular characteristics of the segment of the computing environment. Furthermore, the partitioning of the application into client code and server code may be performed automatically to provide an efficient split between client and server classes.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of automatically generating client/server applications from an application written to execute on a single processing system and having program classes and programmed methods associated with the objects, the method comprising the steps of:

identifying each program class in the application;

determining the relationships between programmed methods in the identified classes;

weighting the relationships between the programmed methods in the identified classes based on the interaction between the programmed methods in the identified classes;

weighting each identified class in the application based on the computing resources required by the identified class; and partitioning the identified classes into client classes and server classes based on the weighted relationships between the programmed methods in the program classes, the weight associated with each program class and a computing topology associated with a target client processing system.

2. A method according to claim 1, wherein said step of weighting the relationships between the programmed methods comprises the step of weighting the relationships between the programmed methods based on a textual analysis of the application written to execute on a single processing system.

3. A method according to claim 1, wherein said step of weighting the relationships between the programmed methods comprises the step of weighting the relationships between the programmed methods based on a result of a profiling analysis of the application written to execute on a single processing system.

4. A method according to claim 1, wherein said step of weighting the relationships between the programmed methods comprises the steps of:

determining for each calling programmed method, where the called programmed method is associated with a different program class than the calling programmed method, the number of times the called programmed method associated with the different program class is called by the calling programmed method; and assigning, for each calling programmed method and called programmed method, a weight associated with the program class of the calling programmed method and the program class of the called programmed method, wherein the weight is based on the number of times the calling programmed method calls the called programmed method.

5. A method according to claim 4, further comprising the step of adjusting the weights of the relationships between the programmed methods by a predefined adjustment factor.

6. A method according to claim 1, wherein said step of weighting each identified classes comprises the steps of:

instantiating each program object of a class;

determining the marginal resources utilized to instantiate each program object; and assigning a weight to each program class based on the determined marginal resources utilized to instantiate the program objects of the class.

7. A method according to claim 6, further comprising the step of adjusting the weights of each identified class by a predefined adjustment factor.

8. A method according to claim 6, wherein said step of weighting the relationships between the programmed methods comprises the steps of:

determining for each calling programmed method, where the called programmed method is associated with a different program class than the calling programmed method, the number of times the called programmed method associated with the different program class is called by the calling programmed method; and assigning, for each calling programmed method and called programmed method, a weight associated with the program class of the calling programmed method and the program class of the called programmed method, wherein the weight is based on the number of times the calling programmed method calls the called programmed method.

9. A method according to claim 8, wherein said step of partitioning the identified objects comprises the steps of:

selecting a subset of program classes based on the sum of the weights of the program classes and a target client system threshold value; and selecting the subset of program classes as client classes and the remainder of the program classes as server classes based on the sum of the weights associated with programmed methods of the program classes of the subset of program classes and a target client cut weight threshold value.

10. A method according to claim 9, wherein the selected subset of program classes is the subset of program classes which satisfies the target client system threshold value and has the lowest sum of the weights associated with programmed methods of the program classes of the subset of program classes.

11. A method according to claim 1, wherein said partitioning step is carried out for a plurality of computing topologies associated with a plurality of target client processing systems so as to provide a plurality of sets of client classes and corresponding server classes.

12. A method according to claim 1, further comprising the step of:

generating a client application based on the objects of classes partitioned as client classes and a server application based on the objects of classes partitioned as server classes.

13. A method according to claim 12, further comprising the step of:

distributing client objects to a client computer system in response to a request for execution of the client application.

14. A method according to claim 13, wherein said distributing step comprises the steps of:

receiving a request for the client application and a client capability set;

selecting a client application based on the received client capability set; and providing to the client the client application corresponding to the client capability set.

15. A method according to claim 1, wherein said identifying step and said determining step comprise the step of generating a call graph of the classes and methods of the application wherein nodes of the call graph correspond to classes of the application, subnodes of the call graph correspond to methods of a class and directed arcs between the nodes or subnodes of the graph correspond to calls from one method to another.

16. A method according to claim 15, wherein said step of weighting the relationships between the programmed methods in the identified classes based on the activity of the relationship comprises the step of assigning a weight to each directed arc of the call graph based on the expected number of traversals of the directed arc during execution of the application; and wherein said step of weighting each identified class in the application based on the computing resources required by the identified class comprises the step of assigning to each node of the call graph a weight based on the expected resources required by each node.

17. A system for automatically generating client/server applications from an application written to execute on a single processing system and having program classes and programmed methods associated with the objects, comprising:

means for identifying each program class in the application;

means for determining the relationships between programmed methods in the identified classes;

means for weighting the relationships between the programmed methods in the identified classes based on the interaction between the programmed methods in the identified classes;

means for weighting each identified class in the application based on the computing resources required by the identified class; and means for partitioning the identified classes into client classes and server classes based on the weighted relationships between the programmed methods in the program classes, the weight associated with each program class and a computing topology associated with a target client processing system.

18. A system according to claim 17, wherein said means for weighting the relationships between the programmed methods comprises means for weighting the relationships between the programmed methods based on a textual analysis of the application written to execute on a single processing system.

19. A system according to claim 17, wherein said means for weighting the relationships between the programmed methods comprises:

means for determining for each calling programmed method, where the called programmed method is associated with a different program class than the calling programmed method, the number of times the called programmed method associated with the different program class is called by the calling programmed method; and means for assigning, for each calling programmed method and called programmed method, a weight associated with the program class of the calling programmed method and the program class of the called programmed method, wherein the weight is based on the number of times the calling programmed method calls the called programmed method.

20. A system according to claim 17, wherein said means for weighting each identified classes comprises:

means for instantiating each program object of a class;

means for determining the marginal resources utilized to instantiate each program object; and means for assigning a weight to each program class based on the determined marginal resources utilized to instantiate the program objects of the class.

21. A computer program product for automatically generating client/server applications from an application written to execute on a single processing system and having program classes and programmed methods associated with the objects, the computer program product comprising:

a computer readable storage medium having computer-readable program code means embodied in said medium, said computer-readable program code means comprising:

computer-readable program code means for identifying each program class in the application;

computer-readable program code means for determining the relationships between programmed methods in the identified classes;

computer-readable program code means for weighting the relationships between the programmed methods in the identified classes based on the interaction between the programmed methods in the identified classes;

computer-readable program code means for weighting each identified class in the application based on the computing resources required by the identified class; and computer-readable program code means for partitioning the identified classes into client classes and server classes based on the weighted relationships between the programmed methods in the program classes, the weight associated with each program class and a computing topology associated with a target client processing system.

22. A computer program product according to claim 21, wherein said computer-readable program code means for weighting the relationships between the programmed methods comprises computer-readable program code means for weighting the relationships between the programmed methods based on a textual analysis of the application written to execute on a single processing system.

23. A computer program product according to claim 21, wherein said computer-readable program code means for weighting the relationships between the programmed methods comprises:

computer-readable program code means for determining for each calling programmed method, where the called programmed method is associated with a different program class than the calling programmed method, the number of times the called programmed method associated with the different program class is called by the calling programmed method; and computer-readable program code means for assigning, for each calling programmed method and called programmed method, a weight associated with the program class of the calling programmed method and the program class of the called programmed method, wherein the weight is based on the number of times the calling programmed method calls the called programmed method.

24. A computer program product according to claim 21, wherein said computer-readable program code means for weighting each identified classes comprises:

computer-readable program code means for instantiating each program object of a class;

computer-readable program code means for determining the marginal resources utilized to instantiate each program object; and computer-readable program code means for assigning a weight to each program class based on the determined marginal resources utilized to instantiate the program objects of the class.

* * * * *